United States Patent
Chumbimuni-Torres et al.

(10) Patent No.: US 10,900,925 B2
(45) Date of Patent: Jan. 26, 2021

(54) ION-SELECTIVE ELECTRODE SYSTEMS AND METHODS UTILIZING SAME

(71) Applicant: University of Central Florida Research Foundation, Inc., Orlando, FL (US)

(72) Inventors: Karin Y. Chumbimuni-Torres, Oviedo, FL (US); Samantha Mensah, Weston, FL (US); Percy Calvo-Marzal, Oviedo, FL (US); Michelle Rich, Boca Raton, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 328 days.

(21) Appl. No.: 15/555,754

(22) PCT Filed: Mar. 4, 2016

(86) PCT No.: PCT/US2016/021002
§ 371 (c)(1),
(2) Date: Sep. 5, 2017

(87) PCT Pub. No.: WO2016/141337
PCT Pub. Date: Sep. 9, 2016

(65) Prior Publication Data
US 2018/0136160 A1    May 17, 2018

Related U.S. Application Data
(60) Provisional application No. 62/128,484, filed on Mar. 4, 2015.

(51) Int. Cl.
*G01N 27/333* (2006.01)
*B01L 3/00* (2006.01)
*G01N 27/30* (2006.01)

(52) U.S. Cl.
CPC ........ *G01N 27/3335* (2013.01); *B01L 3/5027* (2013.01); *G01N 27/301* (2013.01);
(Continued)

(58) Field of Classification Search
CPC ............. G01N 27/3335; G01N 27/333; G01N 27/307; G01N 27/301; B01L 3/5027; B01L 2300/0645
See application file for complete search history.

(56) References Cited

U.S. PATENT DOCUMENTS

| | | | |
|---|---|---|---|
| 2005/0191428 A1 | 9/2005 | Buck | |
| 2007/0259997 A1 | 11/2007 | Bakker et al. | |
| 2010/0193376 A1* | 8/2010 | Rius Ferrus | ....... G01N 27/3335 205/775 |

FOREIGN PATENT DOCUMENTS

| | | |
|---|---|---|
| WO | 2010076717 | 7/2010 |
| WO | 2013186363 | 12/2013 |

OTHER PUBLICATIONS

International Search Report and Written Opinion for PCT Application PCT/US16/021002 dated Mar. 4, 2016, pp. 1-18.
(Continued)

*Primary Examiner* — Arun S Phasge
(74) *Attorney, Agent, or Firm* — Timothy H. Van Dyke; Beusse, Wolter, Sanks & Maire PLLC

(57) ABSTRACT

ISEs comprising a substrate layer; a carbon nanotube layer disposed on the substrate layer; a conductive metal layer on a portion of the carbon nanotube layer; a conductive polymer disposed on the portion; and an ion-selective membrane disposed on the conductive polymer and methods of making them are provided. A system is also provided for detecting a plurality of analyte ions in a sample comprising a housing; a plurality of ISEs associated with the housing, each electrode comprising an ion-selective membrane to a different analyte ion; a reference electrode associated with the hous-
(Continued)

ing; a fluid sample receptacle associated with the housing and in fluid communication with the plurality of ion-selective electrodes and reference electrode.

19 Claims, 16 Drawing Sheets

(52) U.S. Cl.
CPC ......... *G01N 27/307* (2013.01); *G01N 27/333* (2013.01); *B01L 2300/0645* (2013.01)

(56) References Cited

OTHER PUBLICATIONS

Sadeghi, R.; Karimi-Maleh, H.; Khalilzadeh, M. A.; Beitollahi, H.; Ranjbarha, Z.;Zanousi, M. B. P. Environ. Sci. Pollut. R 2013, 20, 6584-6593.
Jain, R.; Tiwari, D. C.; Pandey, P. Electroanalysis 2013, 25, 1363-1367.
Rubinova, N.; Chumbimuni-Torres, K.; Bakker, E. Sens. Actuators, B 2007, 121, 135-141.
Bobacka, J.; Ivaska, A.; Lewenstam, A. Electroanalysis 2003, 15, 366-374.
Chumbimuni-Torres, K. Y.; Dai, Z.; Rubinova, N.; Xiang, Y.; Pretsch, E.; Wang, J.; Bakker, E. J. Am. Chem. Soc 2006, 128, 13676-13677.
Numnuam, A.; Chumbimuni-Torres, K. Y.; Xiang, Y.; Bash, R.; Thavarungkul, P.; Kanatharana, P.; Pretsch, E.; Wang, J.; Bakker, E. Anal. Chem. 2008, 80, 707-712.
Michalska, A.; Hulanicki, A.; Lewenstam, A. Microchem. J. 1997, 57, 59-64.
Bobacka, J. Anal. Chem. 1999, 71, 4932-4937.
Zielinska, R.; Mulik, E.; Michalska, A.; Achmatowicz, S.; Maj-Zurawska, M. Anal. Chim. Acta 2002, 451, 243-249.
Michalska, A. J.; Appaih-Kusi, C.; Heng, L. Y.; Walkiewicz, S.; Hall, E. A. H. Anal. Chem. 2004, 76, 2031-2039.
Chumbimuni-Torres, K. Y.; Rubinova, N.; Radu, A.; Kubota, L. T.; Bakker, E. Anal. Chem. 2006, 78, 1318-1322.
Veder, J. P.; De Marco, R.; Clarke, G.; Chester, R.; Nelson, A.; Prince, K.; Pretsch, E.; Bakkert, E. Anal. Chem. 2008, 80, 6731-6740.
Fibbioli, M.; Morf, W. E.; Badertscher, M.; de Rooij, N. F.; Pretsch, E. Electroanalysis 2000, 12, 1286-1292.
Borchardt, M.; Dumschat, C.; Cammann, K.; Knoll, M. Sens. Actuators, B 1995, 25, 721-723.
Dumschat, C.; Borchardt, M.; Diekmann, C.; Cammann, K.; Knoll, M. Sens. Actuators, B 1995, 24, 279-281.
Aragay, G.; Monton, H.; Pons, J.; Font-Bardia, M.; Merkoci, A. J. Mater. Chem. 2012, 22, 5978-5983.
Szucs, J.; Gyurcsanyi, R. E. Electroanalysis 2012, 24, 146-152.
Martinez, A. W.; Phillips, S. T.; Whitesides, G. M.; Carrilho, E. Anal. Chem. 2010, 82, 3-10.
Dungchai, W.; Chailapakul, O.; Henry, C. S. Analyst 2011, 136, 77-82.
Apilux, A.; Dungchai, W.; Siangproh, W.; Praphairaksit, N.; Henry, C. S.; Chailapakul, O. Anal. Chem. 2010, 82, 1727-1732.
Martinez, A. W.; Phillips, S. T.; Butte, M. J.; Whitesides, G. M. Angew. Chem. Int. Ed 2007, 46, 1318-1320.
Martinez, A. W.; Phillips, S. T.; Carrilho, E.; Thomas, S. W.; Sindi, H.; Whitesides, G. M. Anal. Chem. 2008, 80, 3699-3707.
Hu, L. B.; Choi, J. W.; Yang, Y.; Jeong, S.; La Mantia, F.; Cui, L. F.; Cui, Y. Proc. Natl. Acad. Sci. U.S.A. 2009, 106, 21490-21494.
Hu, L. B.; Pasta, M.; La Mantia, F.; Cui, L. F.; Jeong, S.; Deshazer, H. D.; Choi, J. W.; Han, S. M.; Cui, Y. Nano Lett 2010, 10, 708-714.
Hu, L. B.; Wu, H.; Cui, Y. Appl. Phys. Lett. 2010, 96, 183502.
Duzgun, A.; Zelada-Guillen, G. A.; Crespo, G. A.; Macho, S.; Riu, J.; Rius, F. X. Anal. Bioanal. Chem 2011, 399, 171-181.
Zhu, J. W.; Li, X.; Qin, Y.; Zhang, Y. H. Sens. Actuators, B 2010, 148, 166-172.
Zhu, J. W.; Qin, Y.; Zhang, Y. H. Electrochem. Commun 2009, 11, 1684-1687.
Crespo, G. A.; Macho, S.; Rius, F. X. Anal. Chem. 2008, 80, 1316-1322.
Crespo, G. A.; Macho, S.; Bobacka, J.; Rius, F. X. Anal. Chem. 2009, 81, 676-681.
Novell, M.; Parrilla, M.; Crespo, G. A.; Rius, F. X.; Andrade, F. J. Anal. Chem. 2012, 84, 4695-4702.
Hertel, T.; Walkup, R. E.; Avouris, P. Phys. Rev. B 1998, 58, 13870-13873.
Liu, J.; Rinzler, A. G.; Dai, H. J.; Hafner, J. H.; Bradley, R. K.; Boul, P. J.; Lu, A.; Iverson, T.; Shelimov, K.; Huffman, C. B.; Rodriguez-Macias, F.; Shon, Y. S.; Lee, T. R.; Colbert, D. T.; Smalley, R. E. Science 1998, 280, 1253-1256.
Cattrall, R. W.; Drew, D. M.; Hamilton, I. C. Anal. Chim. Acta 1975, 76, 269-277.
Lai, C. Z.; Fierke, M. A.; Stein, A.; Buhlmann, P. Anal. Chem. 2007, 79, 4621-4626.
Jaworska, E.; Lewandowski, W.; Mieczkowski, J.; Maksymiuk, K.; Michalska, A. Analyst 2013, 138, 2363-2371.
Gu, Y. Q.; Huang, J. G. J. Mater. Chem. 2009, 19, 3764-3770.
Bakker, E. Anal. Chem. 1997, 69, 1061-1069.
Bakker, E.; Pretsch, E.; Buhlmann, P. Anal. Chem. 2000, 72, 1127-1133.
A. Ceresa, E. Bakker, B. Hattendorf, D. Gunther, E. Pretsch, Potentiometric polymeric membrane electrodes for measurement of environmental samples at trace PCT Patent levels: New requirements for selectivities and measuring protocols, and comparison with ICPMS, Anal Chem, 73(2001) 343-51.
A. Ceresa, A. Radu, S. Peper, E. Bakker, E. Pretsch, Rational design of potentiometric trace level ion sensors. A Ag+-selective electrode with a 100 ppt detection limit, Anal Chem, 74(2002) 4027-36.
E. Bakker, E. Pretsch, Potentiometry at trace levels, Trac-Trend Anal Chem, 20(2001) 11-9.
E. Bakker, E. Pretsch, The new wave of ion-selective electrodes., Anal Chem, 74(2002) 420a-6a.
A.C. Ion, E. Bakker, E. Pretsch, Potentiometric Cd2+-selective electrode with a detection limit in the low ppt range, Anal Chim Acta, 440(2001) 71-9.
S.T. Mensah, Y. Gonzalez, P. Calvo-Marzal, K.Y. Chumbimuni-Torres, Nanomolar Detection Limits of Cd2+, Ag+, and K+ Using Paper-Strip Ion-Selective Electrodes, Anal Chem, 86(2014) 7269-73.
J. Bobacka, Conducting polymer-based solid-state ion-selective electrodes, Electroanal, 18(2006) 7-18.
E. Pretsch, The new wave of ion-selective electrodes, Trac-Trend Anal Chem, 26(2007) 46-51.
J. Sutter, A. Radu, S. Peper, E. Bakker, E. Pretsch, Solid-contact polymeric membrane electrodes with detection limits in the subnanomolar range, Anal Chim Acta, 523(2004) 53-9.
A. Malon, A. Radu, W. Qin, Y. Qin, A. Ceresa, M. Maj-Zurawska, et al., Improving the detection limit of anion-selective electrodes: An iodide-selective membrane with a nanomolar detection limit, Anal Chem, 75(2003) 3865-71.
S. Peper, I. Tsagkatakis, E. Bakker, Cross-linked dodecyl acrylate microspheres: novel matrices for plasticizer-free optical ion sensing, Anal Chim Acta, 442(2001) 25-33.
D.N. Reinhoudt, J.F.J. Engbersen, Z. Brzozka, H.H. Vandenvlekkert, G.W.N. Honig, H.A.J. Holterman, et al., Development of Durable K+-Selective Chemically-Modified Field-Effect Transistors with Functionalized Polysiloxane Membranes, Anal Chem, 66(1994) 3618-23.
Y. Qin, S. Peper, A. Radu, A. Ceresa, E. Bakker, Plasticizer-free polymer containing a covalently immobilized Ca2+-selective Ionophore for potentiometric and optical sensors, Anal Chem, 75(2003) 3038-45.
E. Lindner, V.V. Cosofret, S. Ufer, T.A. Johnson, R.B. Ash, H.T. Nagle, et al., In-Vivo and in-Vitro Testing of Microelectronically Fabricated Planar Sensors Designed for Applications in Cardiology, Fresen J Anal Chem, 346(1993) 584-8.

(56) References Cited

OTHER PUBLICATIONS

G. Hogg, O. Lutze, K. Cammann, Novel membrane material for ion-selective fieldeffect transistors with extended lifetime and improved selectivity, Anal Chim Acta, 335(1996) 103-9.

A.. Hammer, D. Gloor-Ertekes, P. Reichmuth, E. Pretsch, W.E. Morf, N.F.D. Rooij, Chemical sensors based on novel polyurethane membranes with covalently bound ionselective components, Adv Sci Technol, 26(1999) 63-8.

M.E. Poplawski, R.B. Brown, K.L. Rho, S.Y. Yun, H.J. Lee, G.S. Cha, et al., Onecomponent room temperature vulcanizing-type silicone rubber-based sodium-selective membrane electrodes, Anal Chim Acta, 355(1997) 249-57.

G.J. Moody, B. Saad, J.D.R. Thomas, Glass-Transition Temperatures of Polyvinyl-Chloride) and Polyacrylate Materials and Calcium Ion-Selective Electrode Properties, Analyst, 112(1987) 1143-7.

L.Y. Heng, E.A.H. Hall, Methacrylic-acrylic polymers in ion-selective membranes: achieving the right polymer recipe, Anal Chim Acta, 403(2000) 77-89.

L.Y. Heng, E.A.H. Hall, Producing "self-plasticizing" ion-selective membranes, Anal Chem, 72(2000) 42-51.

E.. Malinowska, L. Gawart, P. Parzuchowski, G. Rokicki, Z. Brzozka, Novel approach of immobilization of calix[4]arene type ionophore in 'self-plasticized' polymeric membrane, Anal Chim Acta, 421(2000) 93-101.

L.Y. Heng, E.A.H. Hall, One-step synthesis of K+-selective methacrylic-acrylic copolymers containing grafted ionophore and requiring no plasticizer, Electroanal, 12(2000) 178-86.

L.Y. Heng, E.A.H. Hall, Taking the plasticizer out of methacrylic-acrylic membranes for K+-selective electrodes, Electroanal, 12(2000) 187-93.

L.Y. Heng, E.A.H. Hall, Assessing a photocured self-plasticised acrylic membrane recipe for Na+ and K+ ion selective electrodes, Anal Chim Acta, 443(2001) 25-40.

L.Y. Heng, K. Toth, E.A.H. Hall, Ion-transport and diffusion coefficients of nonplasticised methacrylic-acrylic ion-selective membranes, Talanta, 63(2004) 73-87.

R. De Marco, J.P. Veder, G. Clarke, A. Nelson, K. Prince, E. Pretsch, et al., Evidence of a water layer in solid-contact polymeric ion sensors, Phys Chem Chem Phys, 10(2008) 73-6.

Y. Qin, S. Peper, E. Bakker, Plasticizer-free polymer membrane ion-selective electrodes containing a methacrylic copolymer matrix, Electro anal, 14(2002) 1375-81.

I. Erol, A.I. Ozturk, Free radical copolymerization of novel methacrylates with acrylonitrile and determination of monomer reactivity ratios, J Polym Res, 12(2005) 403-12.

A. Radu, S. Peper, E. Bakker, D. Diamond, Guidelines for improving the lower detection limit of ion-selective electrodes: A systematic approach, Electroanal, 19(2007)144-54.

E. Bakker, "Hydrophobic Membranes as Liquid Junction-Free Reference Electrodes," Electroanalysis 1999, 11 (10-11), 788-792.

D. Cicmil, et al., "Ionic Liquid-Gased, Liquid Junciton-Free Reference Eelctrode," Electroanal. 2011 23 (8): 1888-90.

* cited by examiner

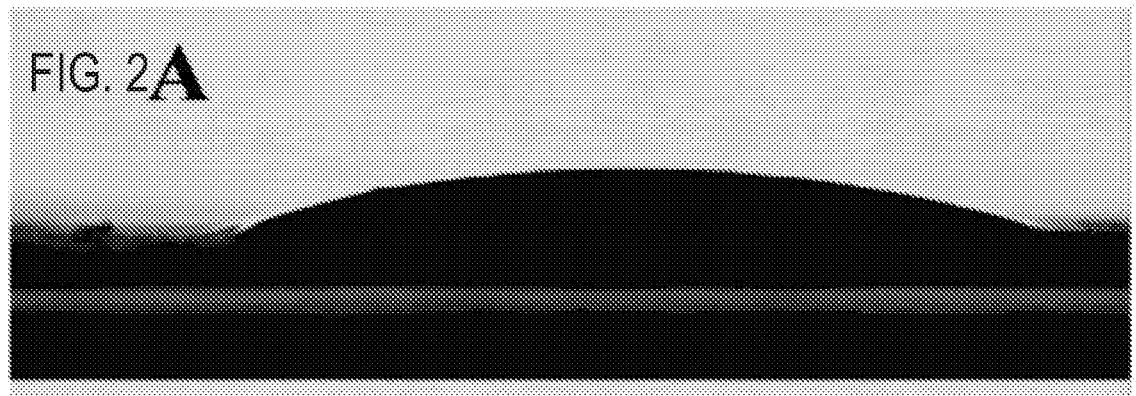
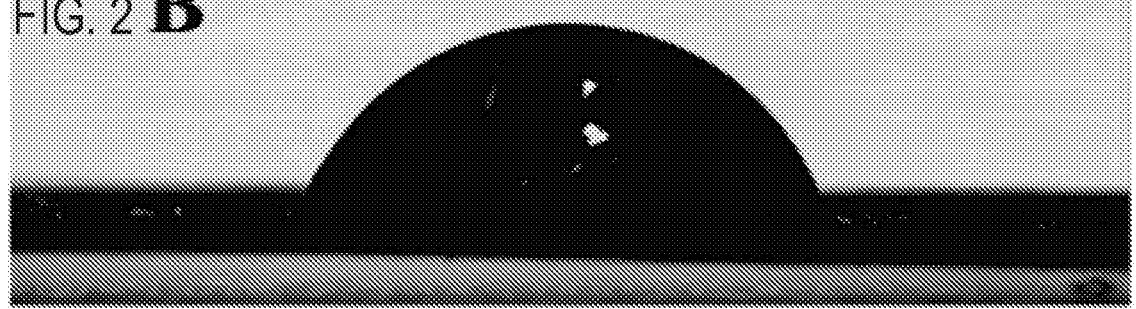
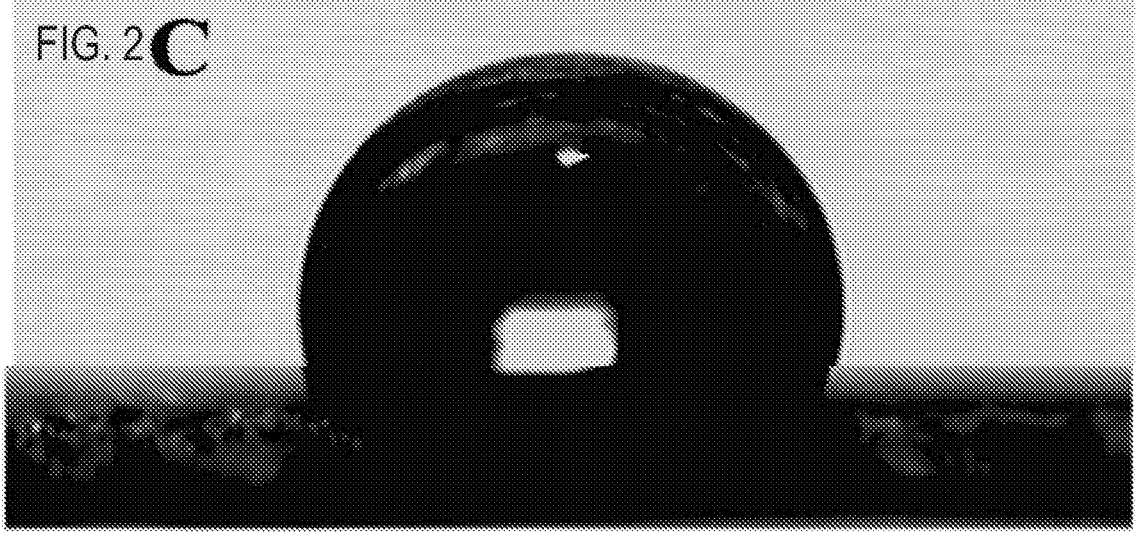

ION-SELECTIVE ELECTRODE SYSTEMS AND METHODS UTILIZING SAME

CROSS-REFERENCE TO RELATED APPLICATIONS

This application claims the benefit of priority of U.S. Provisional Application No. 62/128,484, entitled "Ion-Selective Electrode Systems and Methods Utilizing Same," filed on Mar. 4, 2015, the entire contents of which are incorporated herein.

BACKGROUND

Ion selective electrodes (ISEs) have been used in the detection of many ions for decades, as their high versatility has permitted their suitability for a variety of applications. Conventionally, ISEs have been used for measuring concentrations or activities of particular species of ions in a test solution, for example, measuring concentrations or activities of particular species of ions such as Na ions, K ions, and Cl ions in a test solution. Among the key characteristics of ion-selective electrodes are their sensitivity, accuracy, selectivity and reliability.

Previous generation ISEs need high and low concentration conditioning times to allow doping of the ionophore. And traditionally, the ion-selective membranes have been fabricated with a plasticized polymeric membrane that acts as a support matrix. The conventional choice for the polymer matrix is polyvinyl chloride (PVC) with either bis (2-ethylhexyl sebacate) (DOS) or o-nitrophenyl octyl ether (o-NPOE) as plasticizer to increase the matrix's coefficient of ion diffusion. PVC, along with DOS or o-NPOE, is commercially available, which facilitates its preference over other polymers for use in ion-selective membranes.

However, some disadvantages to utilizing plasticized PVC in ISE membranes have been observed, such as short lifetimes and sample contamination caused by the exudation of the plasticizer and electroactive components out of the ion-selective membranes. Among other adverse effects, this undesired leaching process may impede applicability in in vivo analysis in addition to applicability in small volumes (on the order of several milliliters). Thus, alternative polymers to plasticized PVC are in need. The development of low-cost, portable, flexible, versatile, and reliable sensors for ion detection for use in biomedical and environmental fields is of particular need.

Methacrylic-acrylic copolymers satisfy that need and may be the polymer matrix of choice for ISEs. In particular, it has been discovered that certain ratios of methyl methacrylate-co-decyl methacrylate (MMA-DMA) copolymer are preferable to plasticized PVC due to the low coefficient of diffusion and good adhesion property, where the DMA unit acts as a plasticizer. Moreover, MMA-DMA copolymer presents hydrophobic capability superior to that of plasticized PVC. The integration of this water-repelling copolymer into ion-selective membranes in conjunction with the hydrophobic conducting polymer poly(3-octylthiophene-2,5-diyl) (POT) has been successful in inhibiting the formation of a detrimental water layer formed at the interface between the membrane and the solid substrate in solid-contact ISEs. The elimination of the water layer can improve the detection limits of solid-contact ISEs to nanomolar concentrations while maintaining Nernstian slopes. As a result, the MMA-DMA copolymer used in the construction of ISEs presents an alternative to known ISEs in the art and proves preferable over plasticized PVC for use in biomedical sensing.

SUMMARY

ISEs are provided that utilize optimal ratios of MMA-DMA to detect ions. Additionally, the behavior of the low detection limits for ions and the diffusion coefficient for sodium ion towards different ratios of MMA-DMA is studied for the advancement of such plasticizer-free ISE membranes. Therefore, in certain embodiments, an ion-selective electrode is provided comprising a substrate layer; a carbon nanotube layer disposed on the substrate layer; a conductive metal layer on a portion of the carbon nanotube layer; a conductive polymer disposed on the portion; and an ion-selective membrane disposed on the conductive polymer. In other embodiments, single or multiplex self-referenced sensors are provided.

In certain embodiments, the substrate layer comprises paper, glass, silica, or plastic.

In other embodiments, the ion-selective electrode may further comprise a plastic mask on both sides of the carbon nanotube layer with an opening over the ion-membrane. The carbon nanotube layer is exposed at a location separated from the opening.

In other embodiments, the conductive metal layer is comprised of gold, platinum, copper or silver.

In certain embodiments, the conductive polymer is comprised of polythiophenes; polyanilines; polypyrroles; polyethylene dioxythiophenes; polyacetylenes, and/or poly (p-phenylene vinylenes).

In certain embodiments, the ion-selective membrane is comprised of MMA-DMA. In preferred embodiments, different ratios of MMA-DMA are utilized to detect silver ions. Preferably, these ratios of MMA to DMA are selected from the group consisting of 29:71, 42:56, 42:58, and 50:50. More preferably, the ratio is 42:58. The ion-selective membrane may comprise an ionophore for an analyte ion of interest in certain embodiments. Preferably, the ion-selective membrane has been doped with a salt of an analyte ion of interest. In certain embodiments, the analyte ion of interest is selected from the group consisting of sodium, potassium, silver, lead, cadmium, calcium, magnesium, copper, zinc, mercury, carbonate, phosphate, fluorine, bromine, sulfer, hydrogen sulfite, aluminum, and ammonium ions. In certain embodiments, the ion-selective electrode comprises an ion-selective membrane that is comprised of polyvinyl chloride, silicone rubber, polyurethane, Teflon, acrylate, and/or perfluoropolymers.

In certain embodiments, a method of making an ion-selective electrode is provided comprising mixing an ionophore specific to an analyte ion of interest, and a membrane polymer, and optionally a salt of the analyte ion of interest, to produce a mixture; and applying the mixture to a conductive substrate. The mixture may be applied to the conductive surface under conditions to allow the mixture to set.

In preferred embodiments, the conductive substrate is comprised of a substrate layer and a carbon nanotube layer disposed on the substrate layer, wherein the mixture is applied to the carbon nanotube layer. The conductive substrate may be comprised of a substrate layer, a carbon nanotube layer disposed on the substrate layer; and a conductive metal layer on a portion of the carbon nanotube layer; wherein the mixture is applied onto the conductive metal layer. In other embodiments, the conductive substrate is comprised of a substrate layer; a carbon nanotube layer disposed on the substrate layer; a conductive metal layer on a portion of the carbon nanotube layer; and a conductive polymer layer disposed on the portion; wherein the mixture is applied to the conductive polymer layer.

In yet other embodiments, a system for detecting a plurality of analyte ions in a sample is provided where the system comprises a housing; a plurality of ion-selective electrodes as described herein associated with the housing, and each electrode comprises an ion-selective membrane to a different analyte ion of interest; and a reference electrode associated with the housing; and a fluid sample receptacle associated with said housing and in fluid communication with said plurality of ion-selective electrodes and reference electrode. The system comprises a microfluidic device comprising a plurality of channels for delivering said fluid sample to the plurality of ion-selective electrodes and reference electrode.

In certain embodiments, the plurality of ion-selective electrodes and the reference electrode are effectively separated such that detection of an analyte ion of by one ion-selective electrode does not interfere with detection of a different analyte ion by a different ion-selective electrode.

BRIEF DESCRIPTION OF THE DRAWINGS

The following drawings form part of the present specification and are included to further demonstrate certain embodiments of the present disclosure. The disclosure may be better understood by reference to one or more of these drawings in combination with the detailed description of specific embodiments presented herein.

FIG. 2A-FIG. 2C illustrate contact angle images of (FIG. 2A) the filter paper coated with SWCNTs suspension, (FIG. 2B) filter paper coated with SWCNTs suspension and subsequent layer of POT, and (FIG. 2C) filter paper coated with SWCNTs suspension, layers of sputtered gold and POT; according to an embodiment,
(FIG. 10C-FIG. 10D) 42:58 MMA-DMA, and (FIG. 10E-FIG. 10F) 29:71 MMA-DMA copolymer after conditioning (FIG. 10A, FIG. 10C, and FIG. 10E) $1.0\times10^{-3}$ $AgNO_3$ and subsequently in (FIG. 10B, FIG. 10D, and FIG. 10F) $1.0\times10^{-9}$ $AgNO_3$ and $1.0\times10^{-5}$ $NaNO_3$; according to an embodiment.

DETAILED DESCRIPTION

Figure 1A:
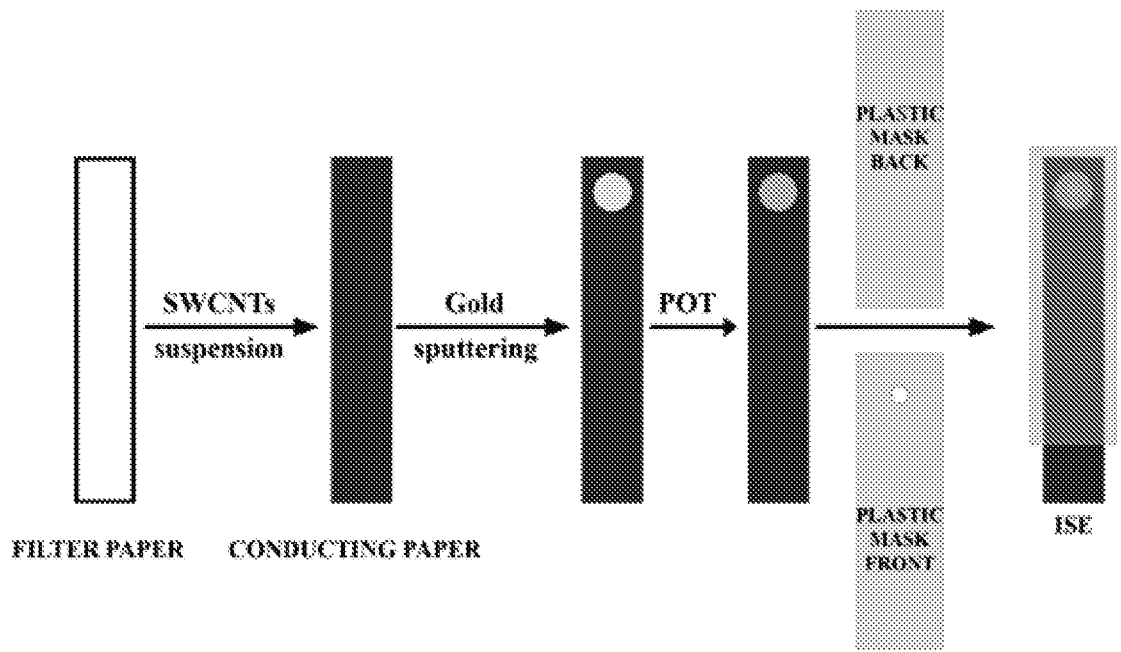
FIG. 1A-1B is a schematic of a method embodiment for making an ISE embodiment where (FIG. 1A) a representation of the preparation of the masked paper-based sensors is provided and (FIG. 1B) a self-reference paper-based sensor is provided as described herein.

Disclosed herein is an ion-selective electrode improved in terms of applicability, reliability, detectability, and selectivity towards an ion of interest. In one embodiment, the electrode comprises a substrate layer such as a strip of paper, glass, solid plastic, silica, etc. coated with single-walled carbon nanotubes "SWCNTs". In a specific embodiment, a portion of the carbon nanotube substrate is coated with a conductive metal, such as gold or other suitable conductive metal. The conductive metal portion is then coated with a conductive polymer. The use of the conductive metal helps serve as an intermediary to allow the conductive polymer to attach to the substrate. As will be described further below, the conductive polymer also significantly increases the hydrophobicity of the electrode to prevent interference or damage to the electrode by the sample solution. An ion-selective membrane is then disposed or casted on the conductive polymer. The ion-selective membrane contains an ionophore specific to the analyte of interest. Preferably the ion-selective membrane is comprised of the copolymer MMA-DMAs in optimal ratios explained further herein. The conditions involved in casting of the ion selective membrane may include a salt of the analyte ion, which dopes the ionophore.

In other embodiments, the need for high and low concentration conditioning times that allow doping of the ionophore are not required. Rather, non-conditioned ISEs are provided with only hydration time required. Self-referenced paper-based ion-selective electrodes also provide desired characteristics sought for in such a sensor. These can be applied to biomedical and environmental fields for disease detection or contamination in rivers and streams, respectively. For instance, one could measure potassium and sodium levels in blood for prompt diagnosis of conditions such as hypokalemia and hyponatremia, respectively. Herein, non-conditioned ISEs are described in certain embodiments, with only the need for hydration for a certain time period. To function, these ISEs require the use of a reference electrode. The reference electrode (RE) maintains a stable reference voltage in order to measure the potential difference across the ion-selective membrane as the ionic concentration changes. Traditionally, a bulky Ag/AgCl reference membrane in conjunction with a bridge electrolyte make-up commercially available liquid-junction reference electrodes. However, these lack the capability of miniaturization, inhibiting field work studies using ISEs. Therefore interests have focused on the development of solid-contact reference electrodes. The use of poly(methyl methacrylate-co-decyl methacrylate) MMA:DMA (44:56), ionic liquids as membrane defining potential and plasticizer DOS to increase hydrophobicity of the membrane is also described herein.

1. Definitions

It is to be noted that the terms "first," "second," and the like as used herein do not denote any order, quantity, or importance, but rather are used to distinguish one element from another. The terminology used herein is for the purpose of describing particular embodiments only and is not intended to be limiting. As used herein, the singular forms "a," "an," and "the" are intended to include the plural forms as well, unless the context clearly indicates otherwise these terms do not denote a limitation of quantity, but rather denote the presence of at least one of the referenced item. Furthermore, to the extent that the terms "including," "includes," "having," "has," "with," or variants thereof are used in either the detailed description and/or the claims, such terms are intended to be inclusive in a manner similar to the term "comprising."

The term "accuracy" as used herein refers to the correctness of the resultant reading.

The term "ion-selective electrode" or "ISE", also known as a "specific ion electrode" or "SIE", as used herein means an electrode which responds selectively to the ions of a particular species in solution or a transducer (or sensor) that converts the activity of a specific ion dissolved in a solution into an electrical potential, which can be measured by a voltmeter or pH meter. The voltage is theoretically dependent on the logarithm of the ionic activity, according to the Nernst equation. The sensing part of the electrode is usually made as an ion-specific membrane, along with a reference electrode. Ion-selective electrodes are used in analytical chemistry and biochemical/biophysical research, where measurements of ionic concentration in an aqueous solution are required, usually on a real time basis.

The term "ion-selective membrane" as used herein means a continuous layer covering a structure or separating two electrolytic solutions. The membrane of an ISE is responsible for the potential response and the selectivity of the electrode.

The term "methyl methacrylate" or "MMA" as used herein means an organic compound with the formula $CH_2=C(CH_3)COOCH_3$.

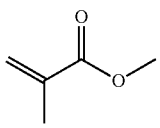

The colorless liquid, the methyl ester of methacrylic acid (MAA) is a monomer that may be produced on a large scale for the production of poly(methyl methacrylate) (PMMA). Its IUPAC name is methyl 2-methylpropenoate and is also known as 2-(methoxycarbonyl)-1-propene.

The term "decyl methacrylate" or "DMA" as used herein means an organic compound with the formula $C_{14}H_{26}O_2$.

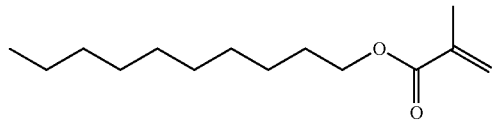 [SMILES: C=C(C)C(=O)OCCCCCCCCCC]

Other names include 2-Propenoic acid, 2-methyl-, decyl ester; n-Decyl methacrylate; Methacrylic acid, decyl ester; and Decyl 2-methylacrylate.

The term "reference electrode" or "RE" as used herein refers to the maintenance of a stable reference voltage in order to measure the potential difference across the ion-selective membrane as the ionic concentration changes.

The term "reliability" refers to the ability of the electrode to maintain its characteristics over extended periods of time.

The term "selectivity" refers to discrimination to interfering ions.

The term "sensitivity" as used herein refers to the ability of the electrode to detect low levels of ion in solution.

The term "standard detection limit" as used herein refers to the concentration (or activity) of the measured ion at the point of intersection between the extrapolated linear segment of the calibration curve representing the normal slope of the electrode and a horizontal line representing the voltage when the concentration is so low that small changes in concentration do not produce any detectable change in the electrode response. The portion of the calibration curve between this point and the beginning of the truly linear section is known as the non-linear range of the electrode. Samples are still measurable within this range provided that several standards are used to define the changing slope of the curve accurately, or where two standards can narrowly span the range of the samples. However, the error in concentration (per millivolt error in measurement) will be progressively greater as the slope reduces.

2. Description of Embodiments

Ion-Selective Paper-Based Micro Electrodes

Nanomolar detection limits of ion-selective microelectrodes have been achieved through the optimization of acrylic copolymer matrices. It has been discovered that the ratio 42:58 of MMA to DMA in the MMA-DMA copolymer is optimal to plasticized known polymers such as PVC in the construction of ISEs for use in biomedical sensing. In certain embodiments, the ISE comprises a substrate layer comprising a strip of paper, glass, solid plastic, or silica, coated with SWCNTs. A portion of the carbon nanotube substrate is coated with a conductive metal, such as gold or other suitable conductive metal known in the art. The conductive metal portion is then coated with a conductive polymer. An ion-selective membrane is then disposed or casted onto the conductive polymer. Preferably the ion-selective membrane is comprised of the copolymer MMA-DMAs as explained further herein. The ion-selective membrane contains an ionophore specific to the analyte of interest. The conditions involved in casting of the ion selective membrane may include a salt of the analyte ion, which dopes the ionophore.

In a specific embodiment, the ion-selective membrane is drop casted in the open-orifice-substrate in one end of a substrate strip and the membrane includes ionophore, ion-exchanger, a polymeric material, and plasticizer.

To bypass electrode conditioning prior to analysis, the ion of interest may be added to the device's ion-selective membrane, typically done prior to casting as to complex the ionophore. The device may be used for point-of-care and in filed applications of ion quantification of biomedical and environmental fluids such as serum, saliva, or seawater.

Traditionally, conditioning establishes a constant analyte ion concentration in the membrane according to the following equation:

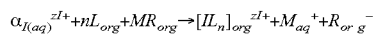

where L is a ligand (ionophore) that forms membrane complex with ion I of stoichiometry n. MR is a lipophilic ion exchanger composed of anion R and its counterion M. In a typical experimental protocol for preparation of ion-selective membranes the ion-exchange is obtained by conditioning of the membrane in aqueous solution containing I.

By adding salt of the analyte ion directly to the membrane cocktail prior to casting, equilibrium between occupied and unoccupied ionophores was established in accordance with the new equation:

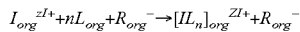

Salts added to the membrane to dope the ionophore in-situ represent the stoichiometric equivalent to satisfy the ion-ionophore$_{org}$ complex $[IL_n]^{zI+}$.

The device offers a mode of advantages over the current pool of electrochemical sensors available. Embodiments described herein exhibit a better limit of detection over other paper-integrated ion sensor in the art. Although ISEs are of high importance for ion detection, they require a cumbersome pre-conditioning step in a solution of the analyte ion prior to measurements. During that period, a zero-current ion flux is established while the ionophore binds to the analyte. This required step highly limits ISEs' in-field application. Disclosed herein is the development of ISEs for ion detection that do not require pre-conditioning. The preconditioned device avoids the need for pretreating before use, thereby allowing immediate and time-effective sample analysis. This feature is particularly helpful for point-of-care medical diagnostics or in-field environmental diagnostics. The simple assembly of the device allows for of ease mass production and taps into the cost-efficient and disposable yet robust nature of paper-integrated analytical devices.

Methods of Making Ion-Selective Paper-Based Micro Electrodes

Presented herein is a novel method of constructing paper-based ISEs with low limits of detection and optimal ratios of the copolymer MMA:DMA. This new approach addresses the influence of the fibrous and porous character of the filter paper, employs intermediate layers to improve liphophilicity for the polymeric membrane, thereby allowing the development of an optimized paper-based analytical device for ultra-trace detection levels of ions. By exploring different modifications of filter paper substrates, the optimal substrate was chosen, yielding limits of detection in the nanomolar range (the lowest-reported for paper-based ISEs to date). The new platform presented here established a simple and universal configuration of paper-based ion-selective electrodes and was applied to various ions ($Cd^{2+}$, $Ag^+$ and $K^+$). In addition to such low limits of detection, the paper-strip ISEs display good selectivity and reproducibility. This electrodes fabrication method may be applied in paper-based assays of biomolecules (proteins and DNA), offering cost-effective medical diagnostics.

In certain embodiments, a method of making an ion-selective electrode is provided comprising mixing an ionophore specific to an analyte ion of interest, and a membrane polymer, and optionally a salt of the analyte ion of interest, to produce a mixture; and applying the mixture to a conductive substrate. The mixture may be applied to the conductive surface under conditions to allow the mixture to set.

In preferred embodiments, the conductive substrate is comprised of a substrate layer and a carbon nanotube layer disposed on the substrate layer, wherein the mixture is applied to the carbon nanotube layer. The conductive substrate may be comprised of a substrate layer, a carbon nanotube layer disposed on the substrate layer; and a conductive metal layer on a portion of the carbon nanotube layer; wherein the mixture is applied onto the conductive metal layer. In other embodiments, the conductive substrate is comprised of a substrate layer; a carbon nanotube layer disposed on the substrate layer; a conductive metal layer on a portion of the carbon nanotube layer; and a conductive polymer layer disposed on the portion; wherein the mixture is applied to the conductive polymer layer.

In one embodiment, a method of making a paper based ISE is provided herein. Reference is made to the scheme provided in FIG. 1A. A first step involves coating a substrate (e.g. strip of paper) with a SWCNT suspension. Substrate materials for use in forming ISEs include but are not limited to, glass and modified or functionalized glass, plastics (including acrylics, polystyrene and copolymers of styrene and other materials, polypropylene, polyethylene, polybutylene, polycarbonate, polyurethanes, Teflon, derivatives thereof, etc.), polysaccharides, nylon or nitrocellulose, paper and other cellulose-based materials, resins, mica, silica or silica-based materials including silicon and modified silicon, carbon, inorganic glasses, fiberglass, ceramics, GETEK (a blend of polypropylene oxide and fiberglass) and a variety of other polymers and their functionalized derivatives.

In another embodiment, a method of making a self-reference paper-based ISE is provided herein. Reference is made to the scheme provided in FIG. 1B. A first step involves coating a substrate (e.g. strip of paper) with a SWCNT suspension. Substrate materials for use in forming ISEs include but are not limited to, glass and modified or functionalized glass, plastics (including acrylics, polystyrene and copolymers of styrene and other materials, polypropylene, polyethylene, polybutylene, polycarbonate, polyurethanes, Teflon, derivatives thereof, etc.), polysaccharides, nylon or nitrocellulose, paper and other cellulose-based materials, resins, mica, silica or silica-based materials including silicon and modified silicon, carbon, inorganic glasses, fiberglass, ceramics, GETEK (a blend of polypropylene oxide and fiberglass) and a variety of other polymers and their functionalized derivatives. A RE is used to maintain a stable reference voltage.

In certain embodiments, the construction and optimization of ISEs is based on commercially available filter paper as a solid substrate, modified with SWCNTs, sputtered gold, and conducting polymer to support the ion-selective membrane. Since the filter paper is inherently non-conductive, in certain embodiments it was treated with a SWCNTs suspension similarly to the method proposed by Cui et al. (See Cui, L. F.; Cui, Y. *Proc. Natl. Acad. Sci.* USA 2009.) Preferably, the porous structure of the filter paper produces capillary forces when in contact with the SWCNTs suspension, promoting high surface contact with the SWCNTs and ultimately yielding highly conductive filter paper as a substrate. In certain embodiments, the SWCNTs suspension, the filter paper, and the conductive paper were characterized by SEM. Resistance of the conductive paper is measured at the end of each cycle (coating and drying).

In a specific embodiment, the SWCNT suspension is a mixture of SWCNT and sodium dodecylbenzenesulfonate, prepared following the method reported by Cui et al. (See Hu, L. B.; Choi, J. W.; Yang, Y.; Jeong, S.; La Mantia, F.; Cui, L. F.; Cui, Y. Proc. Natl. Acad. Sci. USA 2009, 106, 21490-21494; Hu, L. B.; Wu, H.; Cui, Y. Appl. Phys. Lett. 2010, 96, 183502).

In other embodiments, a strip of filter paper is then painted with the SWCNT suspension to saturation until constant conductivity upon each coating is achieved. The role of this suspension in the device is to act as an electrochemical transducer for the ion-selective membrane during measurements. In other embodiments, three different configurations of conductive paper strip "CPS" are characterized. Contact angle measurements were performed in certain embodiments, where 2.5 µL of water was dropped onto the surface of each sensor. Each surface yielded a drastically different contact angle (FIG. 2A-2C). Surprisingly, although sensor B and C each contained POT as the contact layer, vastly different contact angles were observed 74° for sensor B and 116° for sensor C. Without being bound by theory, this observation can be explained by the influence of the layers beneath.

Although the filter paper substrate is completely covered with the SWCNTs suspension, the conductive paper still retains the high porosity of the uncoated filter paper, making the surface more susceptible to water absorption, displaying a lower contact angle (FIG. 2B). In sensor C (FIG. 2C), the layer of sputtered gold filled in those pores, consequently blocking the capillary forces and avoiding water adsorption. Unexpectedly, sensor A presented a contact angle of 18° indicates a highly hydrophilic surface, although it is known that SWCNTs have high lipophilicity.

In certain embodiments, the application of a metal layer allows better contact between the substrate and membrane, and also serves to decrease capillary forces. The metal selected may be excellent in electrical conductivity and resists oxidation, among which, gold is good candidate. Those skilled in the art will appreciate that other metals may be implemented in lieu of or in addition to gold. In preferred embodiments, the metal conductive component is sputtered onto the sensing end of the device in a circular fashion. The sputter gold impregnates the fibers of the filter paper and may reduce the effect of capillary forces exerted by the porous filter paper, thus preventing water or hydrophilic samples to enter the device during measurements.

In an alternative embodiment, a conductive polymer layer may be cast upon the metal layer, and optimizes the device by further facilitating contact between the polymeric membrane and the substrate. This polymer may be prepared by dissolution in an organic solvent, such as, but not limited to, dichloromethane or chloroform. Many conductive polymers are known in the art that may be utilized in producing ion-selective electrode embodiments as described herein. A non-limiting list of such polymers includes polythiophenes such as Poly(3-butylthiophene-2,5-diyl); Poly(3-hexylthiophene-2,5-diyl); Poly(3-octylthiophene-2,5-diyl); Poly(3-decylthiophene-2,5-diyl); Poly(3-dodecylthiophene-2,5-diyl); polyanilines; polypyrroles; polyethylenedioxythiophenes; polyacetylenes, and poly (p-phenylene vinylenes. Those skilled in the art will appreciate that other polymer matrices for the ion-selective membrane that may be used include, but are not limited to, polyvinyl chloride, silicone rubber, polyurethane, Teflon, acrylates such as polyacrylate or methy-methalacrylate, perfluoropolymers and the like. (See Bakker et al., Chem. Rev., 1997 97:1593-1687 for examples of different membrane polymer matrices that may be implemented.)

Polymeric material may comprise the polymerization or copolymerization product of at least one monomer carrying at least one charged site, and at least one inert monomer. Preferably, material comprises the polymerization product of anionic, cationic, or zwitterionic species, and typically at least one other non-ionic species. A non-limiting exemplary list of charged sites which may be associated with species polymerized to form material includes sulfonate, carboxylate, phosphonate, ammonium groups, quaternary ammonium groups, phosphonium groups, quaternary phosphonium groups, etc. A wide range of counter ions to balance these charged groups may be employed, and ions to be analyzed by the electrode of the invention and/or ions participating in the reference redox couple may be advantageously selected as counter ions.

An exemplary list of polymers suitable for use as material includes polystyrene having fixed charged sites, perfluorinated ionomers, sulfonated styrene-divinyl benzene resins, divinyl naphthalene acid polymers, vinyl pyridinium salts, quaternized vinyl benzyl halides, and acrylate polymers, nitrile-containing polymers, amide-containing polymers, and the like.

Monomers suitable for polymerization or copolymerization to form polymeric material of the present invention are described in U.S. Pat. No. 4,434,249, and an article entitled "Acrylic Ion-Transfer Polymers", issued Feb. 28, 1984, by C. L. Ballestrasse and T. R. Beck, *Journal of the Electrochemical Society*, 134, 11, 2745-2749 (1987), both of which are incorporated herein by reference. According to one preferred embodiment, polymeric material comprises the copolymerization product of at least one charged acrylic monomer and at least one neutral acrylic monomer. Copolymerization of material may be effected by conventional means including anionic, cationic, or free-radical polymerization initiators.

In a particularly preferred embodiment, polymeric material comprises a copolymer of optimal ratios of MMA and DMA (e.g., 42:58). In other embodiments, MMA-DMA is preferable over polyvinyl chloride generating a plasticizer-free ISE membrane. A random copolymer may be employed, for example made from the polymerization reaction of a mixture of these monomers in a predetermined ratio, or a block copolymer comprising blocks of from about 1 to 500 monomer units of each of the above-noted monomers may be fabricated. A block copolymer may be a random mixture of blocks of a variety of molecular weights, or may be a mixture of blocks of relatively narrow molecular weights, depending upon the application. Preferably, a mixture of MMA and DMA monomers are polymerized in solution.

According to embodiments herein above described, polymeric material may include immobilized positively charged sites, negatively-charged sites, or both positively and negatively charged sites. According to embodiments in which only negatively charged or positively-charged immobilized sites exist in polymeric material, addition of salts to material may be particularly advantageous and is within the scope of the present invention. As noted above, the counterions of the immobilized charged sites associated with material may be advantageously selected so as to be the same as either analyte ions in a solution or ions involved in reference redox couple. Salts selected for addition to polymeric material may also be advantageously selected so as to include analyte ions and/or ions involved in reference redox couple. For example, when a silver/silver chloride redox couple is employed, ion selective membrane is selective for a particular cation, and polymeric material includes immobilized positively charged sites, a salt including the cation to be analyzed and chloride may advantageously be added to polymeric material.

Addition of such salts to polymeric material typically advantageously affects the transference characteristic of material. The principle transference is described in U.S. Pat. No. 4,434,249, referenced above. It is advantageous according to the present invention to fabricate ion selective sensor to have an overall transference approaching an ideal value of 1.0 for the ion to be sensed, while having a transference approaching an ideal value of zero for ions of charged opposite that of the ion to be sensed. However, within polymeric material itself, it is desirable that transference number for both cationic and anionic species be greater than zero, preferably between about 0.1 and about 1.0.

Addition of salts to polymeric material may be carried out according to several methods. According to one method, polymeric material may be cast as a free-standing polymer, cut to size, and soaked in an aqueous solution comprising the salt to be added. Typically, such an aqueous solution has a concentration of about 0.1-0.2 M. Alternatively, material may be polymerized or copolymerized in the presence of such salts, or may be drop cast or spin cast from a solution including the selected salt during the fabrication of ion sensitive sensor or ion selective field effect transistors or, described below. According to another method, salts may be screen-printed onto redox couple prior to application of polymeric material.

According to an embodiment, a particular salt is added preferably such that the cationic and anionic transference numbers of polymeric material are both within about two orders of magnitude. More preferably, a particular salt is added such that the ratio of cationic to anionic or anionic to cationic transference is not more than about 6.0, still more preferably not more than about 2.6, and most preferably not more than about 1.9. According to preferred embodiments, polymeric material is selected such that such salts may be added without affecting the specificity of cationic or anionic transport within the material.

Mechanical adhesion of layers can be characterized by methods including the tape, blister, scratch/scrape, ultrasonic bath and peel tests. A simple yet effective semi-quantitative test for adherence is the tape test. A plastic laminate tape or other adhesive known in the art may be used in certain embodiments to prevent aqueous sample solutions from entering the device body, allowing the device to be immersed in a solution sample without short-circuiting the electrochemical device. The aperture of the tape on the sensing end of the device exposes the metal/conductive polymer substrate, wherein the polymeric ion-selective membrane is casted. Tape is advantageously selected to have an adhesive strength such that if mechanical adhesion between the layers is good the tape will peel off without disrupting the layers, but if adhesion is poor delamination will occur. Alternatively, pieces of tape with increasing adhesive properties may be used in such a test until delamination of one layer from another layer occurs, or rupture of any layers occurs.

As noted, to impart ion selectivity to material, a suitable ionophore or ion exchanger is typically employed. Contacting, and completely covering polymeric material according to preferred embodiments of the present invention is ion selective material. The choice of material may be made from any of a wide variety of known materials incorporating a variety of known ionophores or ion exchangers to impart ion selectivity to the material. Ion selective material may be a commercially-available or pre-fabricated membrane cut to size and placed atop polymeric material, may be fabricated and dissolved in a suitable solvent and cast onto polymeric material, or may be formulated and polymerized in solution atop polymeric material. Preferably, ion selective material is a membrane cast from solution atop material. Additionally, it is within the scope of the present invention to use other ion selective materials such as ion selective glasses or the like as ion selective material.

In a specific embodiment, the ion-selective membrane consists of ionophores selective to the ion of interest (10 mmol/kg), ion-exchangers (5 mmol/kg) such as sodium tetrakis [3,5-bis (trifluoromethyl) phenyl] borate or potassium tetrakis [3,5-bis (trifluoromethyl) phenyl] borate and polyvinyl chloride and a plasticizer, all components dissolved in tetrahydrafuran and vortexed for a certain period of time, e.g., 30 minutes. Microliters of solution containing the ion of interest is then added to the membrane "cocktail" to complex the ionophore with it and circumvent pretreating. This membrane "cocktail" is then casted upon the sensing side aperture of the device in layers. After the solvent is evaporated, the device is ready for electrochemical measurements. Any known ionophore selective to the ion to be analyzed may be employed. A non-limiting exemplary list of ionophores includes: for potassium, valinomycin, dicyclohexano-18-crown-6, dibenzo-18-crown-6, tetraphenyl borate, tetrakis (p-chlorophenyl) borate; for calcium, bis (didecylphosphate), bis(4-octylphenylphosphate), bis(4-(1, 1,3,3-tetramethylbutyl)phenylphosphate tetracosamethylcyclododecasiloxane, N, N'-di(11-ethoxycarbonyl) undecyl)-N, N',4, 5-tetramethyl-3,6-dioxaoctane diamide; for hydrogen, tridodecylamine, N-methyl N-octadecyl (1-methyl, 2-hydroxy, 2-phenyl) ethylamine, N-octadecyl 3-hydroxy n-propylamine, N, N' bis (octadecyl ethylene amine), p-octadecyloxy-m-chlorophenylhydrazonemeso oxalonitrile; for sodium, monensin, N,N',N'''-triheptyl-N, N', N'''-trimethyl-4,4', 4''-propylidintris-(3-oxabutyramide), N,N,N',N'-tetracyclohexyl-1,2-phenylenedioxydiacetamide, 4-octadecanoyloxymethyl-N,N,N',N'-tetracyclohexyl-1,2-phenylenedioxydiacetamide, bis[(12-crown-4)methyl]dodecylmethylmalonate; for lithium, N, N'-diheptyl-N, N', 5,5-tetramethyl-3,7-dioxononanediamide), 12-crown-4, 6,6-dibenzyl-14 crown-4; for chloride, quaternary ammonium chloride, tributyl tin chloride.

A product list from Sigma-Aldrich is provided herein and provides a non-limiting list of ionophores that can be used to form ion-selective membranes.

Ions that may be detected with electrode embodiments and methods described herein include, but are not limited to, those that contain sodium, potassium, silver, lead, cadmium, calcium, magnesium, copper, zinc, mercury, carbonate, phosphate, fluorine, bromine, sulfer, hydrogen sulfite, aluminum, and ammonium. (See Buhlmann and Li, Suprmolecular Chemistry: From Molecules to Nanomaterials, edited by Philip Gale and jonathan Steed, 2012 John Wiley & sons, Ltd. ISBN:978-O-470-74640-0 for ionophores that may be implemented.)

A variety of components and methods for fabrication of ion selective materials, in particular membranes, in accordance with the present invention are known in the art and may be found, for example, in International Patent Publication No. WO 91/11710, published Aug. 8, 1991, and U.S. Pat. Nos. 4,214,968, 3,562,129, 3,753,887, and 3,856,649, all of which are incorporated herein by reference.

Advantages of Ion-Selective Paper-Based Micro Electrodes Using MMA-DMA Copolymer A problem with ISEs based on solid supports has been the formation of an undesired water layer between the interface of the solid contact support and the ion-selective membrane. This water layer presents an obstacle for ISEs, especially in reaching low limits of detection, since it is prone to contamination. The water layer formed acts as a reservoir, trapping ions in the interface between the solid contact support and the ion selective membrane. The expulsion of ions trapped in the reservoir causes contamination in the interface of the ion-selective membrane and sample solution, resulting in poor limits of detection.

Figure 3:
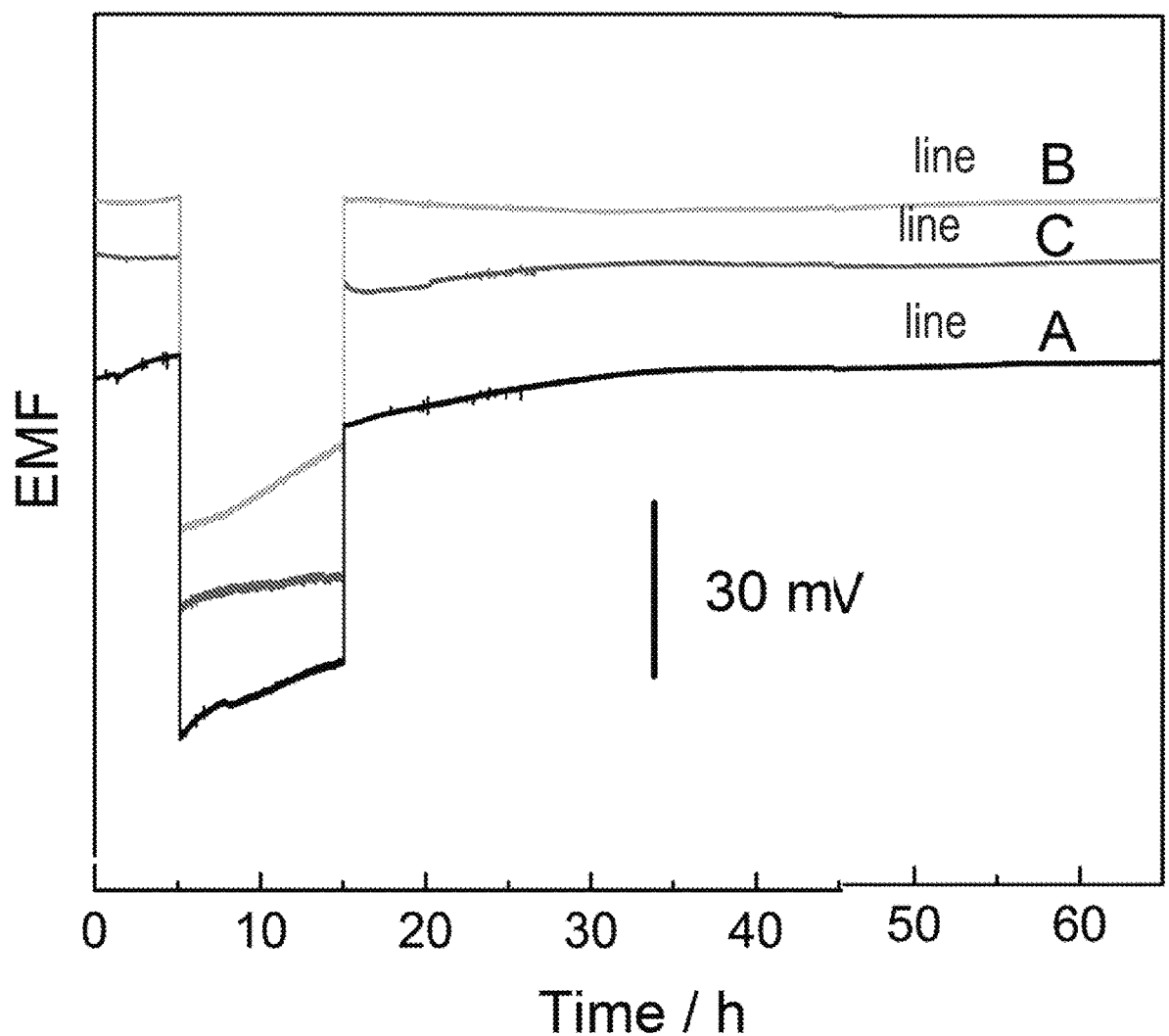
FIG. 3 is a graph illustrating a water layer test for the paper-strip $Cd^{2+}$-ISE using (Line A) filter paper coated SWCNTs, (Line B) filter paper coated SWCNTs and a subsequent layer of POT, and (Line C) filter paper coated SWCNTs, gold sputtered and layer of POT over a period of 65 h; according to an embodiment.

In certain embodiments, a $Cd^{2+}$-selective membrane was prepared on the top of each configuration and a water layer test was performed for sensors A, B and C. The potential was registered in a primary ion solution of $1.0\times10^{-3}$ M of $Cd(NO_3)_2$ for 5 hours, and thereafter changed to a secondary ion solution of $1.0\times10^{-3}$ M of $Ca(NO_3)_2$ and the potential was registered for 10 hours. Finally, this solution was replaced with the primary ion solution and the potential was registered for 50 hours (for these experiments the $Cd^{2+}$-ISE was conditioned in $1.0\times10^{-3}$ M of $Cd(NO_3)_2$ for at least 24 hours). Time trace A (sensor A) in FIG. 3 shows a continuous drifting in potential response for the five hours of exposure to the primary ion solution. After exposure to the secondary ion solution, a high positive drifting was observed, indicating a diffusion of cadmium ions from the water layer formed (in-between the membrane/solid substrate interface) to the sample/membrane interface, resulting in an increased potential readout.

When the sensors were once again exposed to the primary ion solution, a small positive drifting was observed until a stable potential was reached. The time trace B (sensor B) shows a relatively stable potential for the primary ion solution, $Cd(NO_3)_2$, and then a similar behavior to that of sensor A when exposed to the secondary ion solution, $Ca(NO_3)_2$. This behavior also indicates the presence of a water layer at the membrane/solid substrate interface. In time trace C (sensor C), no drifting in the potential was observed when the solutions were switched between $Cd(NO_3)_2$ and $Ca(NO_3)_2$ and vice versa, indicating that there is no significant presence of a water layer between the membrane/solid substrate interface.

Nuclear refractometry was used to show that the copolymer MMA-DMA forms "pools and pockets" of water rather than a well-defined layer. These results can be explained by the conjunction of the water-repellent copolymer MMA-DMA with the hydrophobic conducting polymer POT as an intermediate layer (sensor C), inhibiting water layer formation. (See J. P. Veder, et al., Anal. Chem. 2008, 80, 6731-6740). Although electrode B also has POT as intermediate layer, the observed drifting could be due to the lower hydrophobicity character influence by the porosity of the SWCNT-coated filter paper as observed in the contact angle experiment. Furthermore, in comparison with the results presented by Andrade, (see M. Novell, et al., Anal. Chem. 2012, 84, 4695-4702) sensor C presented better stability at longer times, with no significant water layer formation. It is noteworthy that for the water layer test, the sensors were immersed in the solution for up to 65 hours. In fact, the immersed time of the electrode was even longer considering that they were pre-conditioned for 24 hours before experiments.

Another advantage of including the extra step of modifying the paper-based ISEs with intermediate layers of gold and POT is the insensitivity presented by POT to oxygen, making the sensor more robust if the environment of analysis encounters changes in the concentrations of this gas. It is known that the formation of an oxygen half-cell can affect the phase boundary potential of the ion-selective membranes. (See R. W. Cattrall, et al., Anal. Chim. Acta 1975, 76, 269-277). Buhlmann et al. have shown that ISEs based on three-dimensionally ordered macroporous carbon present negligible drifting of less than 1 mV when exposed to oxygen. (See C. Z. Lai, et al., Anal. Chem. 2007, 79, 4621-4626). The influence of oxygen was tested with $Cd^{2+}$-ISE in the three different configurations of the sensors substrates (A, B and C), by immersing the $Cd^{2+}$-ISE in a solution of $1.0\times10^{-3}$ M $Cd(NO_3)_2$ saturated with oxygen while registering the potential. Sensor A shows the highest drifting, due to oxygen influence in the carbon nanotube impregnated filter paper. When POT was used as an intermediate layer (sensor B), the drifting was greatly reduced. When a layer of gold was introduced in between the conductive paper and POT layer (sensor C) no drifting was presented, indicating high stability in the presence of oxygen.

Figures 4A, 4B, 4C:
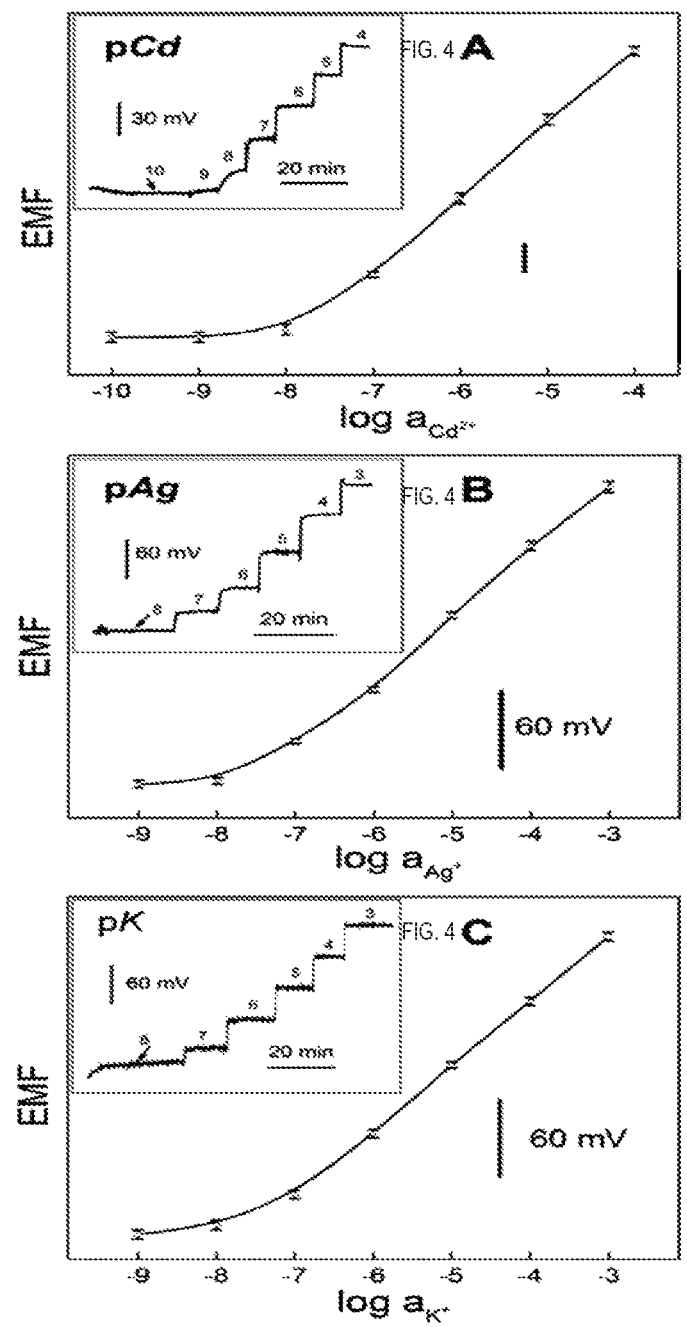
FIG. 4A-4C are graphs illustrating calibration curves of (FIG. 4A) paper-strip $Cd^{2\alpha}$-ISE, (FIG. 4B) paper-strip $Ag^+$-ISE, and (FIG. 4C) paper-strip $K^+$-ISE. Inset: Time traces of the response of the respective paper-strip ISE. Measurements were performed by triplicate; according to an embodiment.

Paper-strip $Cd^{2+}$-ISE, Ag-ISE, and $K^+$-ISEs were constructed using configuration of sensor C. FIG. 4 depicts the response for each paper-strip ISE in a specific background electrolyte, $1.0\times10^{-5}$ M $Ca(NO_3)_2$ for cadmium, $1.0\times10^{-5}$ M $NaNO_3$ for silver and water for potassium. The insets in FIG. 4 show the time traces response for each ISEs. The optimized ISEs present a near-Nernstian slope of 27.4±0.4 mV decade$^{-1}$ with a detection limit of 1.2±1.0 nM for cadmium ions, slope of 54.2±0.6 mV decade$^{-1}$ with a detection limit of 25.1±5.2 nM for silver ions, and slope of 56.7±0.8 mV decade$^{-1}$ with detection limit of 11.0±3.2 nM for potassium ions. The detection limits obtained here are in the same range of those reported for non-paper based solid contact ISEs for silver, (see e.g., K. Y. Chumbimuni-Torres, et al., Anal. Chem. 2006, 78, 1317-1322), potassium (E. Jaworska, et al., Analyst 2013, 138, 2363-2371) and cadmium (see, e.g., A. Numnuam, et al., Anal. Chem. 2008, 80, 707-712). However, to the best of our knowledge, these limits of detection are the lowest detection limits presented to date for any ion in the paper-based ISEs format.

In certain embodiments, three ratios of MMA-DMA copolymer were synthesized and characterized. The apparent coefficient of diffusion of sodium ions for the best ratio of MMA-DMA copolymer was found to be in the order of $10^{-11}$ cm$^2$ s$^{-1}$. All of the diffusion coefficients measured herein was at least two orders of magnitude lower than that of plasticized PVC. The characteristics of the MMA-DMA copolymer such as the coefficient of diffusion of ions make it a good choice for membrane matrix support in ISEs.

The limit of detection and slopes of each $Ag^+$-ISE were evaluated and the best limit of detection was found when the ratio of MMA-DMA of 42-58 was utilized. The finding of this optimal ratio of MMA-DMA copolymer may prove MMA-DMA copolymer to be preferable to plasticized PVC in the construction of ISEs that are reliable for use in biomedical sensing.

The improvement in the limits of detection of the ISEs proposed here are likely due to multiple combined factors: first, the gold layer sputtered into the network of SWCNTs acts as a barrier decreasing the capillary forces created by the high porosity of the filter paper, (see, e.g., Y. Q. Gu, et al., J. Mater. Chem. 2009, 19, 3764-3770) thus preventing the formation of a water layer. Second, the high lipophilicity of the conducting polymer POT avoids the formation of a water layer at the interfaces of the ion-selective membrane and the conductive support. (See N. Rubinova et al., Sens. Actuators, B. 2007, 121, 135-141; J. Sutter, et al., Anal. Chim. Acta 2004, 523, 53-59; and J. Bobacka, Electroanalysis 2006, 18, 7-18). Third, the water-repellent copolymer MMA-DMA has a lower coefficient of diffusion when compared to PVC/DOS ($D_{MMA-DMA}$=~$10^{-11}$ cm$^2$ s$^{-1}$; $D_{PVC-DOS}$=~$10^{-8}$ cm$^2$ s$^{-1}$), (see L. Y. Heng, et al., Talanta 2004, 63, 73-87) promoting lower detection limits as reported before. (See J. Sutter et al., 2004 and K. Y. Chumbimuni-Torres, 2006).

Systems for Detecting a Plurality of Analyte Ions

Microfluidic devices integrated with sensors are getting more and more popular lately, because they provide better operational ways for biological or medical syntheses and analyses. Microfluidic devices are characterized by small size and an automatic diversion function, thus they have plenty of advantages, namely fewer amounts of reagents, miniaturization, fast sensing response, good integration, etc. They minimize manual operations, save reagents and rapidly process voluminous biological data transmitted in parallel, compared with conventional biomedical analytical methods.

By a microfluidic device, it means infusing microliters, or even nanoliters, of liquid into a substrate with micro channels, and making the liquid undergo an intended reaction inside the micro channels by means of a mechanical or non-mechanical pump. To build this miniature structure, it requires a micro electromechanical fabrication method, that is, a fabrication process that involves performing thin film growth, photolithography and etching on a substrate repeatedly. Instead of being limited to a silicon wafer, the substrate can also be glass, quartz or polymer. Polymers from which the substrate can be made include PMMA (polymethylmethacrylate), PC (polycarbonate), PDMS (polydimethylsiloxane), etc.

U.S. Pat. No. 7,229,538 describes a microfluidic device that implements ion-selective electrodes. see also U.S. Pat. No. 6,638,404. US Publication No. 20030003026 also teaches a microfluidic device with electrodes. One skilled in the art will appreciate that the electrodes implemented in this device could be supplanted with the electrode embodiments described herein.

In yet other embodiments, a system for detecting a plurality of analyte ions in a sample is provided where the system comprises a housing; a plurality of ion-selective electrodes as described herein associated with the housing, and each electrode comprises an ion-selective membrane to a different analyte ion of interest; and a reference electrode associated with the housing; and a fluid sample receptacle associated with said housing and in fluid communication with said plurality of ion-selective electrodes and reference electrode. The system comprises a microfluidic device comprising a plurality of channels for delivering said fluid sample to the plurality of ion-selective electrodes and reference electrode.

In certain embodiments, the plurality of ion-selective electrodes and the reference electrode are effectively separated such that detection of an analyte ion of by one ion-selective electrode does not interfere with detection of a different analyte ion by a different ion-selective electrode.

Figure 1B:
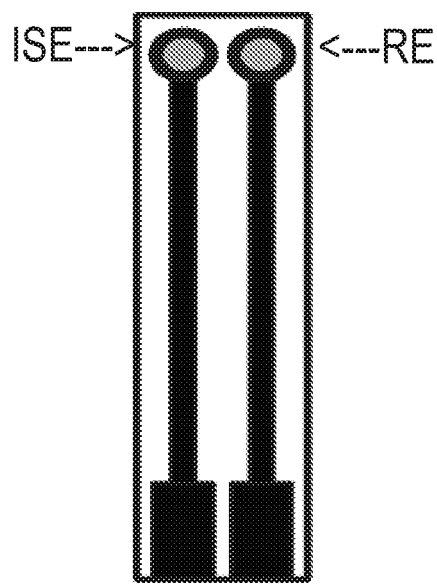

In other embodiments, the system may be a single strip paper based non-conditioned ISE for ion detection as shown in FIG. 1B and as described herein. The self-referenced paper-based sensor comprise an ion selective electrode as described herein and a reference electrode. The reference electrode is a solid-contact reference electrode. Preferably, the solid-contact reference electrode is a poly (methacrylate-co-decyl methacrylate) ionic liquid with a ratio of poly (methacrylate-co-decyl methacrylate) of 44:56.

Figure 13:
FIG. 13 is a photograph illustrating a multiplex self-referenced sensor comprising a ion-selective electrode and one or a plurality of ion-selective electrodes and a reference electrode; according to an embodiment.

In other embodiments, multiplex self-referenced sensors (FIG. 13) are provided for discrimination between ions in a complex matrix, such as a biological sample. The multiplex self-referenced paper-based sensor comprises a plurality of ion-selective electrodes described herein and a reference electrode. Potentiometric detection of ions in blood, urine, and saliva, with a high degree of sensitivity and selectivity are preferable uses. For example, the sensor may comprise a Na+ ion-selective electrode, a K+ ion-selective electrode and a reference electrode. The use of poly(methyl methacrylate-co-decyl methacrylate) MMA:DMA (44:56), ionic liquids as membrane defining potential and plasticizer DOS to increase hydrophobicity of the membrane is preferable. The RE is defined by the phase boundary potential, equation (1) and it's response mechanism is based on limited partitioning of IL to the aqueous phase as seen below.

| Aqueous Phase | | Organic Phase | |
| --- | --- | --- | --- |
| M$^+$ | R$_1^+$ | R$_1$+ | R$_1^+$ |
| A$^-$ | R$_2^-$ | R$_2^-$ | R$_2^-$ |

Response Mechanism RE

Phase Boundry Potential Equation 1

$$E_{PB} = \frac{RT}{z_1 F} \ln\left(\frac{k_1 a_1}{\gamma_1 [I^{zI}]}\right)$$

$R$ = Gas Constant $F$ = Faraday Constant $T$ = Temperature $\gamma_1$ = activity coefficient $z_1$ = charge $k_1$ = constant $a_1$ = activity of the ion $[I^{zI}]$ = concentration of free ion In certain embodiments, the ISEs contain ionophore Sodium Ionophore X, and Potassium Ionophore I, for Na$^+$, K$^+$ ions respectively. Sodium tetrakis[3,5-bis(trifluoro-methyl)phenyl]borate (NaTFPB) and Potassium tetrakis[3, 5-bis(trifluoro-methyl)phenyl]borate (KTFPB) were added as the ion exchanger. Polyvinyl Chloride and Bis(2-ethylhexyl) sebacate (DOS) served as the matrix for support. All the components were dissolved in 1 mL of Tetrahydrofuran (THF). MMA:DMA, Methyl-methacrylate co-dodecyl methacrylate and ionic liquids (IL) were used. The IIs were 1-ethyl-3-methyl-imidizolium [emim]$^+$ and Bis(trifluoromethane sulfonyl)amide [NTf$_2$]. Methylene chloride was used as the solvent.

Figure 11B:
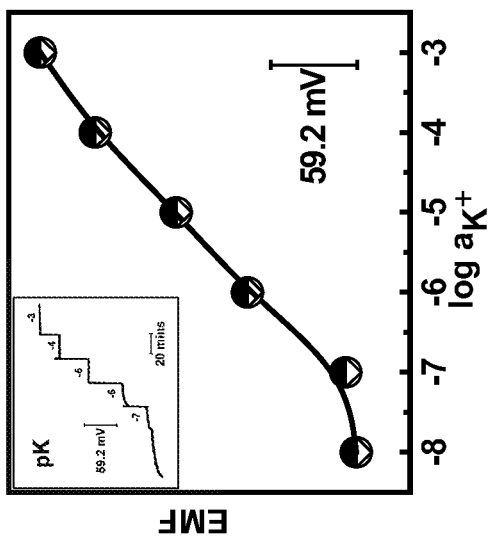
FIG. 11A-11B are graphs illustrating calibration curves for (A) $Na^+$ and (B) $K^+$ against commercial double junction reference Ag/AgCl/3M/KCl/1M LiOAc (Metrohm); according to an embodiment.
Figure 11A:
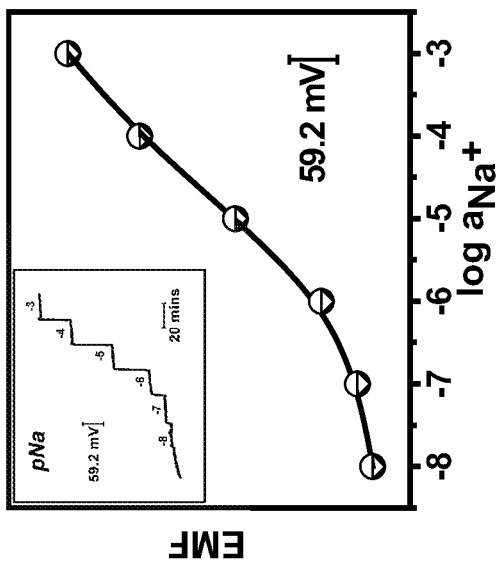

As shown in FIG. 11A-FIG. 11B, the non-conditioned ISEs were developed following the chelating ratios of ionophore to ion of interest. (See Bakker, E., e t al. at 788-792). To achieve lower limits of detection (LODs) a 2:1 ratio of ionophore to ion-exchanger ratios was used. This yielded an average slope of 56.55±0.79 mV decade$^{-1}$ for Na-ISEs and 57.82±0.37 mV decade$^{-1}$ for K$^+$-ISEs, with LODs 5.58×10$^7$ M and 1.16×10$^{-7}$M, respectively. Ratios of MMA:DMA used and calibration curves for Na+ and K$^+$ against commercial double junction reference Ag/AgCl/3MKCl/1M LiOAc (Metrohm) are seen below in Table A.

TABLE A

| Label | | | | Response | Average ΔE KCl | Average ΔE NaCl |
|---|---|---|---|---|---|---|
| A | PVC 10 mg | DOS 5 mg | IL 5 mg | 10$^{-8}$-10$^{-4.3}$ | -40.8 ± 0648 mV | N/A |
| B | MMA:DMA (44:56) 10 mg | DOS 5 mg | IL 5 mg | 10$^{-8}$-10$^{-4.3}$ | 1.80 ± 2.03 mV | 2.20 ± 1.86 mV |
| C | MMA:DMA (44:56) 10 mg | | IL 10 mg | 10$^{-8}$-10$^{-3}$ | 0.86 ± 0.44 mV | -1.83 ± 2.75 mV |
| D | MMA:DMA (44:56) 10 mg | | IL 5 mg | 10$^{-8}$-10$^{-3}$ | -0.51 ± 1.48 mV | 3.466 ± 3.21 mV |
| E | PVC 10 mg | | IL 20 mg | 10$^{-8}$-10$^{-3}$ | 0.27 ± 0.47 mV | -3.88 ± 1.10 mV |
| F | MMA:DMA (44:56) 10 mg | | IL 20 mg | 10$^{-8}$-10$^{-3}$ | 0.34 ± 0.47 mV | 1.99 ± 0.71 mV |

Figure 12B:
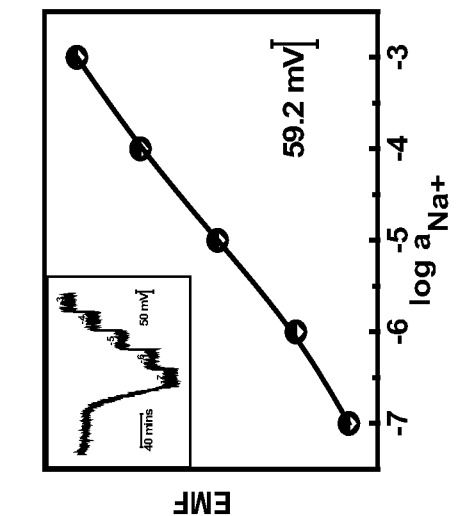
FIG. 12A-12B are graphs illustrating calibration curves for (A) $Na^+$-ISE against solid contact and two separate sensors and (B) single-strip $K^+$-ISE; according to an embodiment.
Figure 12A:
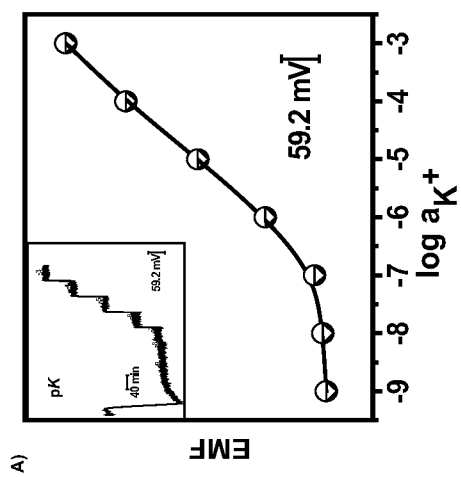

In FIG. 12A-FIG. 12B, the Na$^+$-ISE was run in a water background in order to replicate results obtained against the double junction RE. As a result a slope of 51.2325±0.0.07 mV decade$^{-1}$ was obtained. The K$^+$-ISE was run in a 1.0×10$^{-5}$M LiCl background, yielding a slope of 55.13 mV decade$^{-1}$ and 1.60×10$^{-7}$ M LOD.

Manipulation of the ionophore to ion-exchanger ratio and optimized preparation protocol led to the development of non-conditioned, hydrated only ISEs. MMA:DMA as a reference membrane polymer was found to be superior to PVC, since it was not inhibited by ionic impurities found in PVC. Due to this, PVC has a high sensitivity towards increasing ionic concentration. It was found that a factor in the insensitivity of the membrane was it's thickness. A thinner membrane would be more responsive, as the permeability of the membrane would increase. Lastly, an anionic response occurred at higher concentration of electrolyte, perhaps due to non-uniform partitioning of the ionic liquid, creating a charged site and sensitivity towards anions such as chlorine. DOS was added to increase lipophilicity and successful response was obtained 3. Examples Nanomolar Detection Limits of Cd$^{2+}$, Ag$^+$, and K$^+$ Using Paper-Strip ISEs and MMA-DMA Copolymers Example 1: Materials N,N,N',N'-Tetrabutyl-3,6-dioxaoctanedi(thioamide) (cadmium ionophore I), O-xylenebis (N,N-diisobutyldithiocarbamate) (copper(II) ionophore I), valinomycin (potassium ionophore I), sodium tetrakis[3,5-bis(trifluoromethyl)phenyl]borate (NaTFPB), and tetradodecylammonium tetrakis (4-chlorophenyl)borate (ETH 500), all Selectophore grade, were obtained from Fluka (Buches, Switzerland). Sodium dodecylbenzenesulfonate (SDBS), poly(3-octylthiophene) (POT), and 2, 2azobis(isobutyronitrile) (AIBN, 98% purity) were purchased from Sigma Aldrich (Milwaukee, Wis.). Single-walled carbon nanotubes (SWCNTs) of 99% purity were obtained from Carbon Nanotechnologies (Houston, Tex.). Methylene chloride, chloroform, ethyl acetate, 1,4-dioxane, and qualitative filter paper (Whatman CAT no. 1001090) were acquired from Fisher (Fair Lawn, N.J.).

Methyl methacrylate (99.5% purity) and n-decyl methacrylate (99% purity) were obtained from Polysciences. O-xylenebis (N,N-diisobutyldithiocarbamate) (copper(II) ionophore I), 4-tert-butylcalix[4] arene-tetraacetic acid tetraethyl ester (sodium ionophore X), sodium tetrakis [3,5-bis-(trifluoromethyl) phenyl] borate (NaTFPB), 9-(diethyl-amino)-5-(octadecanoylimino)-5H-benzo[a]phenoxazine (chromoionophore I, ETH 5294), and tetradodecylammoniumetrakis(4-chlorophenyl)borate (ETH 500), all selectophore grade, were obtained from Sigma-Aldrich, USA. 2,2'-Azobisisobutyronitrile (AIBN), anhydrous sodium sulfate, poly(3-octylthiophene-2,5-diyl) (POT), silver nitrate, sodium nitrate, sodium chloride, sodium hydroxide, anhydrous ethyl acetate, 2-nitrophenyl octyl ether (o-NPOE), and sulfuric acid were also purchased from Sigma-Aldrich, USA. Gold wire was acquired from Alfa Aesar, USA. Tris-HCl was purchased from Amresco, USA, HCl was purchased from Fisher, USA, and chloroform was purchased from Acros, Belgium. Acetone, methylene chloride and methanol were purchased from Macron, USA. All solutions were prepared using deionized water purified by a PURELAB Ultra laboratory water purification system at 18.2 MΩ cm (Orlando, Fla.).

Example 2: Preparation of SWCNT Suspension and Conductive Support

The SWCNTs suspension was prepared in accordance with Cui et al. (See Hu, L. B. et al., Proc. Natl. acad. Sci. USA 200, 106, 214900-21494 and Hu, L. B., et al., Nano Lett 2010, 10, 708-714.) Briefly, 3.0 mg/mL of SWCNTs were dispersed in a 1.0 mg/mL of SDBS solution and sonicated for 3 hours using a tip sonicator (Sonics and Materials VCX 500 VibraCell, Newton, Conn.) in an ice bath to avoid overheating. A 6.5×5.5 cm qualitative filter paper was coated with the SWCNTs suspension using a conventional paintbrush. It was then dried at room temperature for 10 minutes and then in an oven at 60° C. for 20 minutes. The conductivity of the resulting coated filter paper was measured using a source-measurement unit (Keithley Source Meter Model 2400, Cleveland, Ohio). This process of coating, drying, and measuring the conductivity of the filter paper was considered one cycle. The filter paper was treated for six cycles. Images of the topography of the filter paper before and after coating with SWCNTs were obtained using Zeiss Ultra 55 Scanning Electron Microscopy (SEM). To obtain SEM images of the filter paper without coating, gold sputtering (Denton Vacuum LLC Desk IV, Moorestown, N.J.) was performed on it to give necessary conductivity to the filter paper.

Example 3: Preparation of the Conductive Paper-Strip

Once the qualitative filter paper was treated with SWCNT suspension, it was cut into 1.0×5.5 cm strips. Three different configurations (A, B, C) of CPS were prepared prior to deposition of each specific ISE membrane. Sensor A was a CPS without any further changes. Sensor B was a CPS with five layers of POT applied in a 0.8 cm diameter circle on one end of the CPS. POT was applied on the solid substrates by drop-casting 20 μL. of 25 mM (respective monomer) in chloroform (resulting in a surface concentration of $4.9 \times 10^{-6}$ mol/cm$^2$). Sensor C was a CPS with a layer of sputtered gold, and then five layers of POT were applied in the same fashion as in sensor B. Each sensor was partially covered in a mask of non-permeable D-Wrap Blue Polyester Tape, as shown in FIG. 1A. On one end of the top layer, a hole of 0.5 cm in diameter was punched to expose the corresponding substrate. On the other end, 1.0 cm$^2$ of the CPS was exposed to provide electrical contact.

Example 4: Characterization of the Modified Paper-Strip Substrates

Each sensor configuration was characterized by its surface hydrophobicity using contact angle measurements from a VCA-Optima surface analysis and computer imaging system (AST Products, Billerica, Mass.) including VCA Optima XE software provided by the manufacturer. Images were taken immediately after dispensing 2.5 μL of deionized water onto each substrate.

Example 5: Preparation of the Ion-Selective Membrane

The cadmium(II)-selective membrane, silver(I)-selective membrane, and potassium(I)-selective membrane were composed of cadmium ionophore I, copper (II) ionophore I and valinomycin respectively (15 mmol/kg), NaTFPB ionic sites (5 mmol/kg), the lipophilic salt ETH 500 (10 mmol/kg) and the copolymer MMA-DMA. MMA-DMA was synthesized in-house. The components of each cocktail were dissolved in 1 mL of methylene chloride, vortexed for 30 min and then sonicated for at least 5 min to degas. Finally, the membranes were obtained by drop-casting the respective cocktail onto the paper-strip solid contact support. Three layers of the cocktail were applied, with waiting times of ten minutes in between each addition, and then dried overnight, resulting in an average thickness of 170±15 μm (obtained using caliper). The ISEs were conditioned before measurements as follows: the paper-strip Cd$^{2+}$-ISE was conditioned in $1.0 \times 10^{-3}$ M Cd(NO$_3$)$_2$ for 24 hours followed by conditioning in a solution of $1.0 \times 10^{-9}$ M Cd(NO$_3$)$_2$ and $1.0 \times 10^{-5}$ Ca(NO$_3$)$_2$ for 12 h. The paper-strip Ag$^+$-ISE was conditioned in $1.0 \times 10^{-3}$ M AgNO$_3$ for 24 hours followed by conditioning in a solution of $1.0 \times 10^{-9}$ M AgNO$_3$ and $1.0 \times 10^{-5}$ NaNO$_3$ for 12 hours. The paper-strip K$^+$-ISE was conditioned in $1.0 \times 10^{-3}$ M KNO$_3$ for 24 h followed by conditioning in a solution of $1.0 \times 10^{-7}$ M KNO$_3$ for 12 h.

Example 6: EMF Measurements

Potentials were monitored with a high-input impedance ($10^{15}$Ω) EMF-16 multichannel data acquisition system (Precision Electrochemistry EMF Interface, Lawson Laboratories, Malvern, Pa.) at room temperature (22° C.), and in stirring solutions. As a reference electrode, double junction Ag/AgCl/3M KCl/1M LiOAc (Metrohm) was used to avoid contamination. All EMF values were corrected for liquid-junction potentials according to the Henderson equation. Activity coefficients were calculated by the Debye-Huckel approximation.

Example 7: Conditioning-Free Ion-Selective Electrode

Although ISEs are of high importance for ion detection, they require a cumbersome pre-conditioning step in a solution of the analyte ion prior to measurements. During that period, a zero-current ion flux is established while the ionophore binds to the analyte. This required step highly limits ISEs' in-field application. Here, we present the development of ISEs for Na+, Ag+, and I– that do not require pre-conditioning.

This Example is explained in reference to the following stages:
  Stage I: Development of liquid contact conditioning-free working electrodes
  Stacie 2: Development of solid contact conditioning-free working and reference electrodes
  Stage 3: Integration of conditioning-free working and reference ISEs into a single joint device Traditionally, conditioning establishes a constant analyte ion concentration in the membrane according to the following equation:

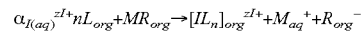

where L is a ligand (ionophore) that forms membrane complex with ion I of stoichiometry n. MR is a lipophilic ion exchanger composed of anion R and its counterion M. In a typical experimental protocol for preparation of ion-selective membranes the ion-exchange is obtained by conditioning of the membrane in aqueous solution containing I.

By adding salt of the analyte ion directly to the membrane cocktail prior to casting, equilibrium between occupied and unoccupied ionophores was established in accordance with the new equation:

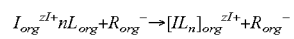

Example 8: Ion-Selective Membranes Preparation

Ion-selective membranes for Na+, Ag+ and I– were prepared with compounds described in Table 1.

TABLE 1

Constituents and respective masses used in preparation of ion-selective membranes for Na$^+$, Ag$^+$, and I$^-$.

| | | |
|---|---|---|
| Sodium | Sodium Ionophore X | 10 |
| | NaTFPB* | 5 |
| | KTFPB | 5 |
| Silver | Copper (II) Ionophore I | 10 |
| | NaTFPB | 5 |
| | AgNO$_3$ | 5 |
| Iodide | [9]Mercuracarborand-3 | 1 |
| | TDMACl/TDMANO$_3$ | 0.75 |
| | NaI | 0.75 |

*Blank membrane contained KTFPB rather than NaTFPB.

Salts added to the membrane to dope the ionophore in-situ represent the stoichiometric equivalent to satisfy the ion-ionophore complex [IL$_n$]$^{zI+}$org. Blank membranes were prepared without analyte salt added.

Example 9: Ion-Selective Electrodes Preparation

Stage 1 and 2 liquid contact and solid-contact substrates, respectively, were prepared by means of previously published work. (See R. Sadeghi, et al., Environ. Sci. Pollut. R. 2013, 20, 6584-6593) and R. Jain, et al., Electroanalysis 2013, 25, 1363-1367). In solid contact, the gold layer and conductive polymer poly(3-octylthiophene) (POT) work in conjunction to eliminate the presence of an undesired water layer and optimize the electrodes in terms of sensitivity and selectivity.

Figure 5A:
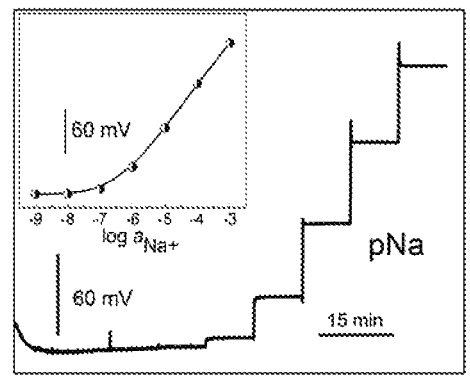
FIG. 5A-5F are graphs illustrating potentiometric response of conditioning-free $Na^+$-selective (left), $Ag^+$-selective (middle), and $I^-$-selective (right) liquid-contact electrodes with the ion of interest added to the membrane cocktail (FIG. 5A-FIG. 5C) and blanks without salt added (FIG. 5D-FIG. 5F). Slopes for Na, Ag, and I responses were 57.05±2.03, 58.05±0.77 and 57.59±2.56 mV decade$^{-1}$, respectively. The super-Nernstian slope in B is indicative of an unsaturated ionophore's initial exposure to and chelation with its ion; according to an embodiment.
Figure 5B:
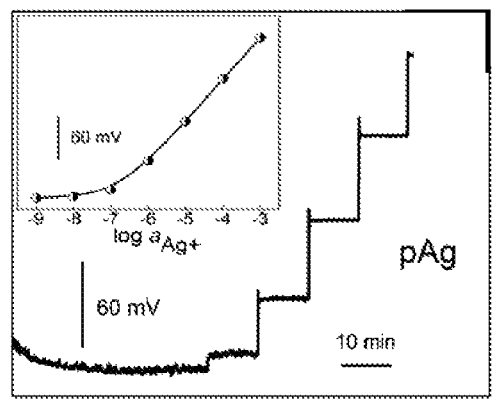
Figure 5C:
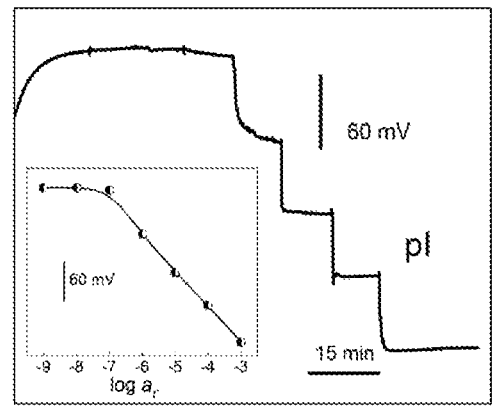
Figure 5D:
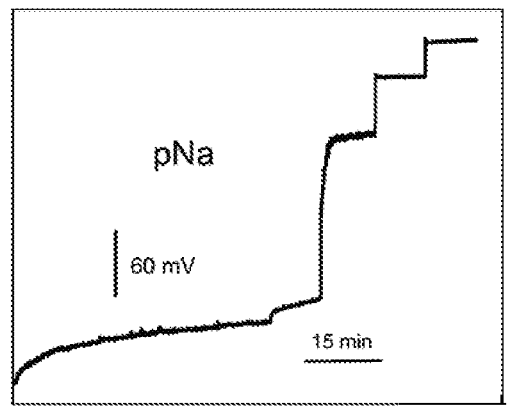
Figure 5E:
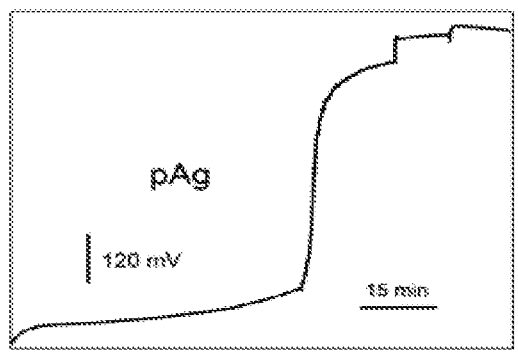
Figure 5F:
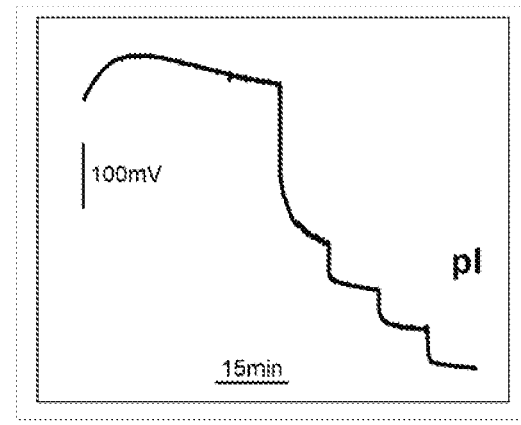
Figure 6:
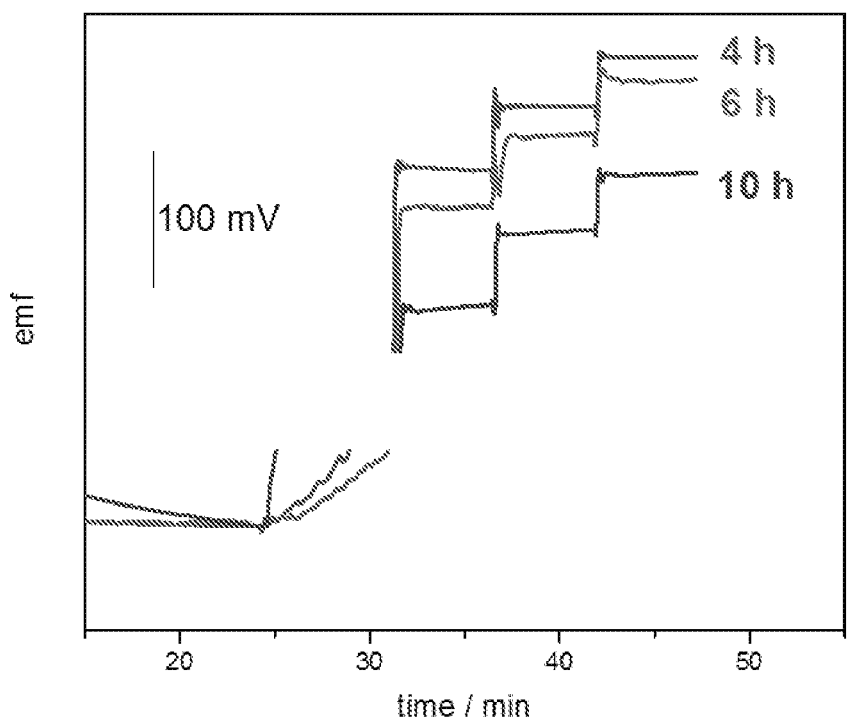
FIG. 6 is a graph that illustrates potentiometric response of $Ag^+$-selective liquid-contact electrodes with conditioning times of 4, 6, and 10 hours; according to an embodiment.

Turning to FIG. 5A-FIG. 5F, the graphs relate to potentiometric responses of stage 1 substrates. A potentiometric response is shown of conditioning-free $Na^+$-selective (first), $Ag^+$-selective (second), and $I^-$-selective (third) liquid-contact electrodes with the ion of interest added to the membrane cocktail (FIG. 5A-FIG. 5C) and blanks without salt added (FIG. 5D-FIG. 5F). Slopes for Na, Ag, and I responses were 57.05±2.03, 58.05±0.77 and 57.59±2.56 mV decade$^{-1}$, respectively. The super-Nernstian slopes in FIG. 5D-FIG. 5F are indicative of an unsaturated ionophore's initial exposure to and chelation with its ion. FIG. 6 shows a potentiometric response of $Ag^+$-selective liquid-contact electrodes with conditioning times of 4, 6, and 10 hours.

Figure 7A:
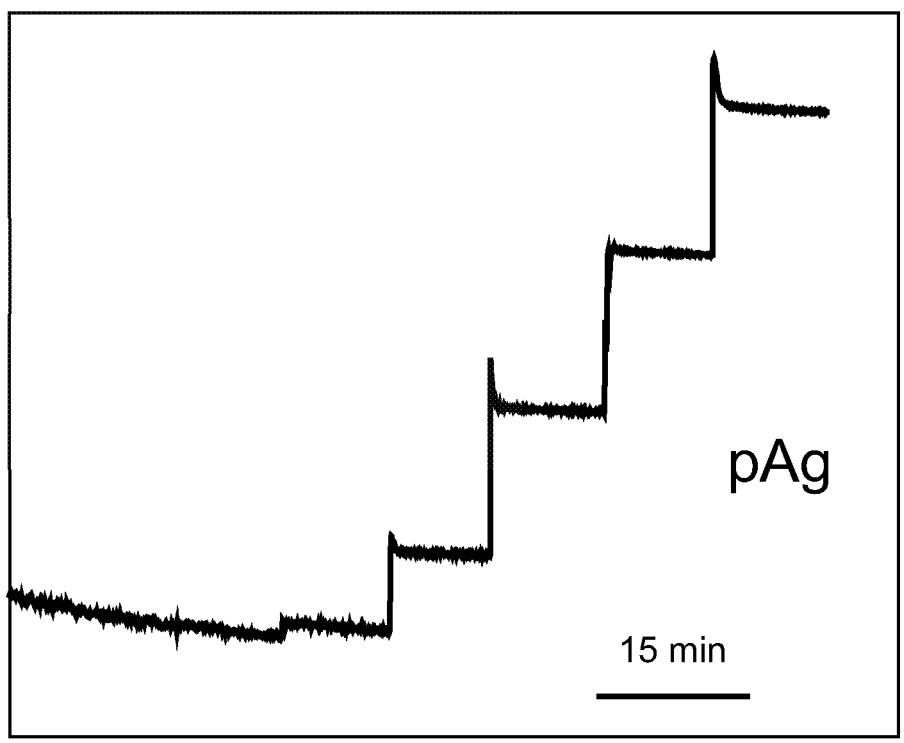
FIG. 7A-FIG. 7C are graphs that illustrate potentiometric response of $Ag^+$-selective solid-contact electrodes with a background of water (FIG. 7A), $10^{-5}$ M $NaNO_3$ (FIG. 7B) and $Na^+$-selective solid-contact electrodes with a background of water (FIG. 7C); according to an embodiment.
Figure 7B:
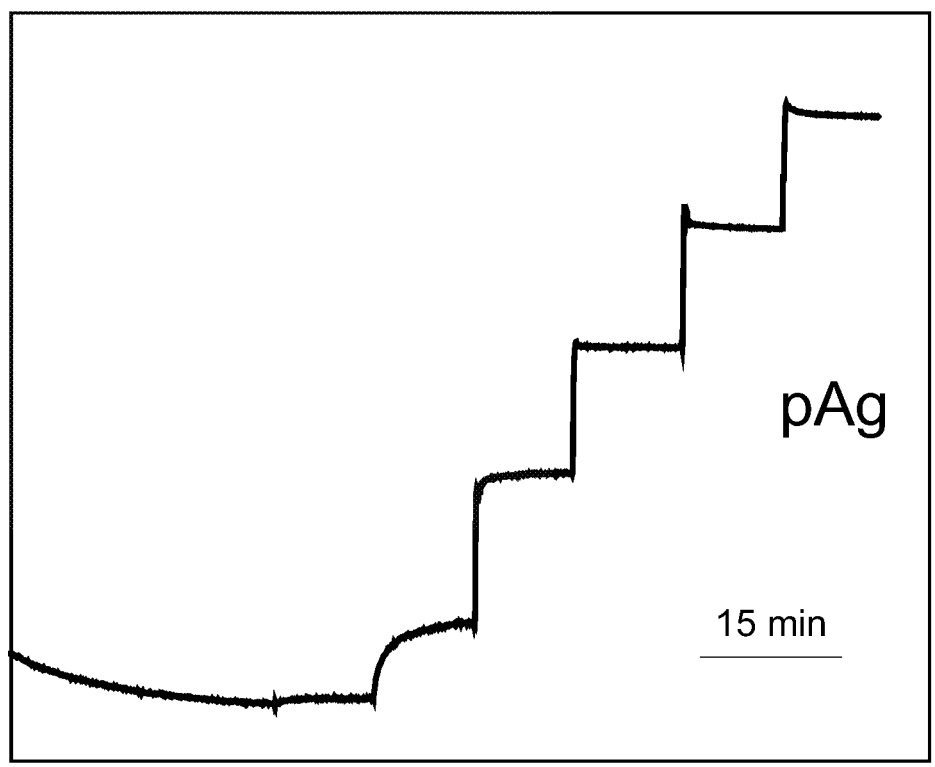
Figure 7C:
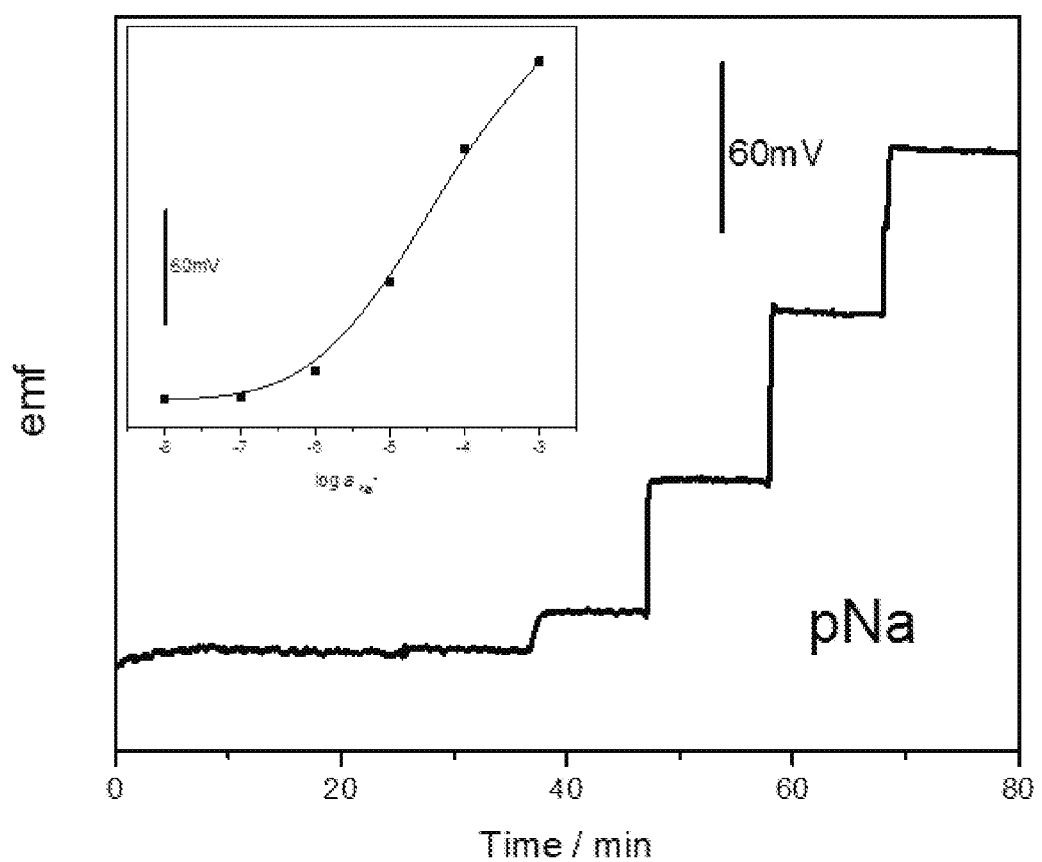

FIG. 7A-FIG. 7C shows a potentiometric response of stage 2 substrates. A potentiometric response is shown for $Ag^+$-selective solid-contact electrodes with a background of water (FIG. 7A), $10^{-5}$ M $NaNO_3$ (FIG. 7B) and $Na^+$-selective solid-contact electrodes with a background of water (FIG. 7C).

Figure 8:
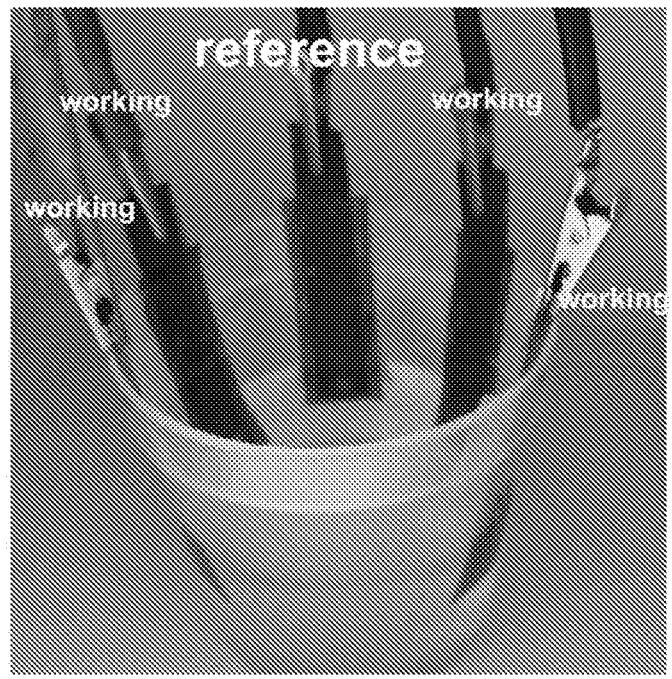
FIG. 8 is a photograph of a scheme 2 template substrate of the joint electrode for single-device sensing; according to an embodiment.

FIG. 8 shows a prototype of a Stage 3 Template substrate of the joint electrode for single-device sensing. As discussed above, various known devices for sample analysis could be adapted to include the electrodes as described herein so that multiple ion or other analyte detections can be achieved in a one device system.

Example 10: Synthesis of MMA-DMA Copolymer by Free Radical Polymerization

Copolymer MMA-DMA was synthesized accordingly to Qin et al. with a few modifications (See, Y. Qin et al., Plasticizer-free polymer membrane ion-selective electrodes containing a methacrylic copolymer matrix, Electroanal, 14 (2002) 1375-81). MMA and DMA monomers were purified before use by washing with caustic solution (50/50 v/v % NaOH) to remove inhibitors, and dried with anhydrous sodium sulfate. The initiator, AIBN, was purified by recrystallization in methanol. The monomers MMA (0.60 g, 9.11 mmol) and DMA (2.36 g, 5.59 mmol) were dissolved in 20 mL of anhydrous ethyl acetate, and degassed for 30 minutes. Under a stream of nitrogen gas, AIBN (2.67 mg, 16.3 µmol) was added. The reaction flask was refluxed overnight at 85° C. under nitrogen gas while stirring. The product was precipitated in methanol. The resulting MMA-DMA (29:71) copolymer was further purified by re-dissolving in methylene chloride to remove unreacted monomers and the precipitation procedure was repeated three times. Afterwards, it was dried under vacuum until use. MMA-DMA of monomer ratios 50:50 and 42:58 were synthesized analogously. 1H NMR: Chem shifts.

Example 11: Copolymer Characterization

The average molecular weight ($M_n$) and polydispersity index (PDI) were determined by GPC (JASCO LC2000) with a diode-array UV-Vis detector and a refractive index detector, using polystyrene as standards and tetrahydrofuran (THF) as eluent. NMR spectra were obtained using a Bruker Avance III at 400 MHz in deuterated chloroform. DSC was performed with a PerkinElmer Clarus 500, from −50° C. to 130° C. at 10° C./min.

Example 12: Measurement of Coefficient of Diffusion of Ions in MMA-DMA Copolymer The coefficients of diffusion for sodium ion in the MMA-DMA copolymer of different ratios were obtained following the method described by Heng et al (24). Thin film membranes consisted of MMA-DMA (80 wt. %), o-NPOE (20 wt. %), sodium ionophore X (118.7 mmol/kg), NaTFPB (59.3 mmol/kg) and chromoionophore I (35.6 mmol/kg), which were dissolved in 0.5 mL dichloromethane to obtain a homogenous solution. This solution (20 µL) was spin coated onto a clean glass slide, designed to fit the cuvette, using a spin coater (Laurell Technology Group, WS-400B-6NPP/LITE) at 900 rpm for 30 seconds, resulting in thin film membrane. All membranes were stored in vacuum until use.

During analysis, the thin film optode membrane was first exposed to 5 mM HCl for approximately 20 minutes (to fully protonate Chromoionophore I). After acidification, the thin film optode membrane was exposed to 1.0 M NaCl in 0.1 M Tris buffer solution at pH 7.00 (adjusted with 6 M HCl). And, the response behavior of the thin film towards sodium ions was monitored by absorption spectroscopy (Cary 50 UV-Vis spectrophotometer), until Chromoionophore I completely deprotonated. All measurements were performed in triplicate.

Example 13: Preparation of the Ion-Selective Electrodes

The solid-contact ISEs were prepared using a gold wire pre-cleaned with a sulfuric acid solution, water, acetone, and methylene chloride and then coated with a solution of POT saturated in methylene chloride. The gold wire was then inserted into a micropipette tip and glued into place at the top end of the pipette tip using silicone. Several ISE membranes were prepared using MMA-DMA with monomer mass ratios of 29-71, 42-58, and 50-50. A silver-selective ISE membrane was used as a model and was prepared using copper(II) ionophore I (47.5 mmol/kg), NaTFPB (13.16 mmol/kg), and ETH 500 (26.13 mmol/kg). The components of each membrane mixture were dissolved in 800 µL of methylene chloride and vortexed for approximately 20 minutes. Three layers of the membrane were then cast onto the tips of the microelectrodes. The electrodes were tested potentiometrically after being conditioned in a solution of $1.0 \times 10^{-3}$ M $AgNO_3$ for 48 hours and then measured again after being conditioned in a solution of $1.0 \times 10^{-9}$ M $AgNO_3$ and $1.0 \times 10^{-5}$ M $NaNO_3$ for 24 hours.

Example 14: EMF Measurements

Potentials were monitored using a high-input impedance ($10^{13} \Omega$) EMF-16 multichannel data acquisition system (Precision Electrochemistry EMF Interface, USA) at room temperature (22° C.), and under stirring. To avoid contamination, the double-junction reference electrode Ag/AgCl/3MKCl/1MLiOAc (Metrohm, USA) was used for the measurements. All potential measurements were carried out in 100 mL polypropylene beakers inside a Faraday cage. Additions of $AgNO_3$ solutions were made through the method of standard addition, at 10 minute intervals. The concentrations of $AgNO_3$ ranged from $1.0 \times 10^{-9}$ M through $1.0 \times 10^{-4}$ M.

Example 15: Synthesis of MMA-DMA Copolymer Via Free Radical Polymerization

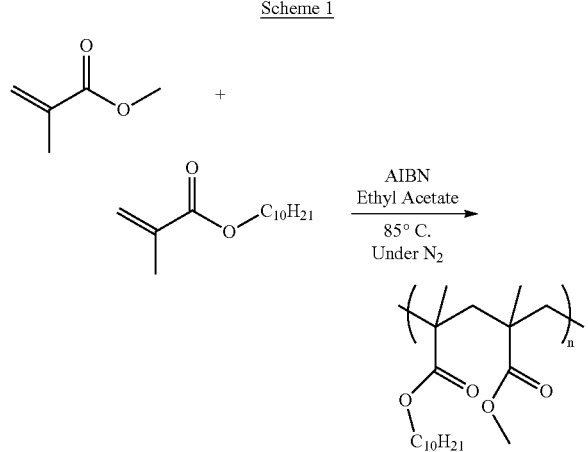

Scheme 1

As mentioned before, synthesis of MMA-DMA copolymer was performed as described by Qin et al. with few modifications as represented above in Scheme 1. Precipitation and purification of the copolymer was the key towards the reproducibility of this synthetic step, which was performed directly in methanol in order to avoid co-precipitation of unreacted monomers. The previous method required removal of impurities by evaporating the monomers in an oven. This step could provide an opportunity for copolymer crosslinking or decomposition, thus reducing the synthesis' reproducibility and causing the copolymer to lose its ideal mechanical properties.

Example 16: Characterization of MMA-DMA Copolymer

MMA-DMA copolymers were characterized by GPC, DSC and H-NMR. As shown in Table 2, the polydispersity index (PDI) values obtained for MMA-DMA copolymers were between 1.6 and 1.9. This can be expected for free radical polymerization methods, since it is known that the PDI of polymers synthesized by free radical polymerization can vary from 1.5 to 2.0 (See I. Erol, A. I. Ozturk, Free radical copolymerization of novel methacrylates with acrylonitrile and determination of monomer reactivity ratios, J. Polym. Res., 12 (2005) 403-12).

TABLE 2

Physical characterization of the MMA-DMA copolymer by gel permeation chromatography and thermogravimetric analysis. The

| MMA:DMA (wt %) | $M_w{}^a$ (×10$^{-4}$) | $M_n{}^b$ (×10$^{-4}$) | PDI | $T_g$ (° C.) |
|---|---|---|---|---|
| 29:71 | 17.21 | 9.12 | 1.89 | not detectable |
| 42:58 | 15.48 | 9.26 | 1.67 | 10 |
| 50:50 | 14.12 | 7.77 | 1.82 | 16 |

Figure 9:
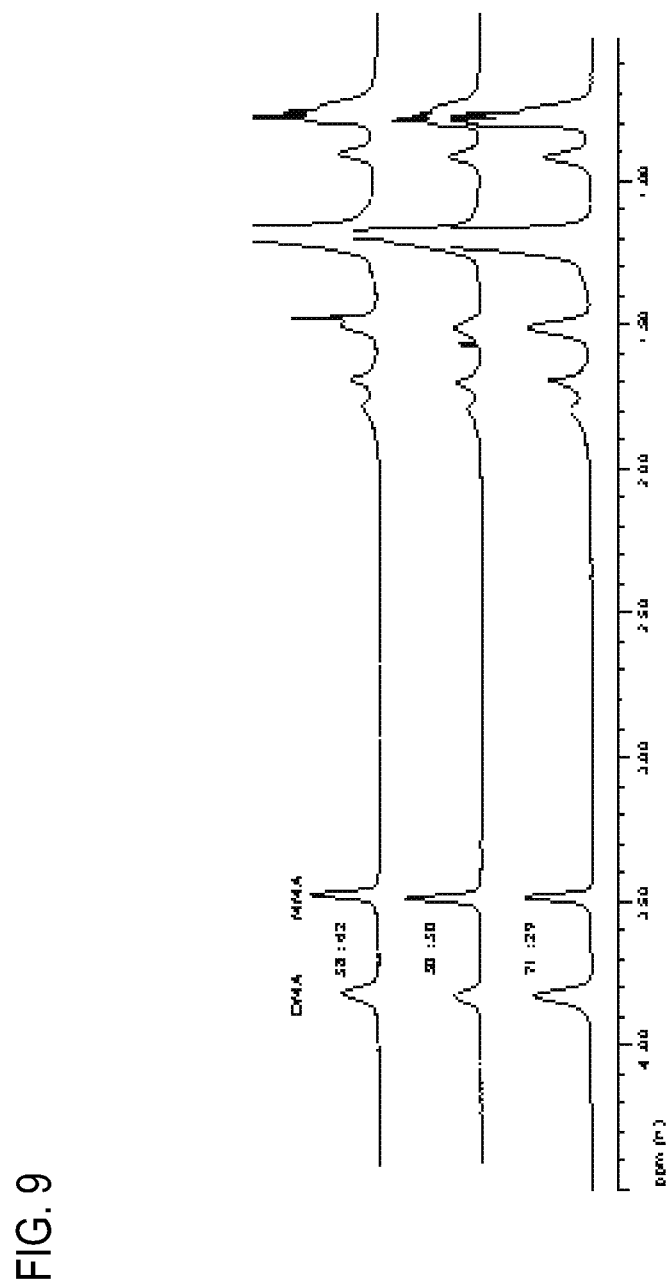
FIG. 9 is a graph illustrating NMR spectra for each MMA-DMA copolymer;
according to an embodiment.
Figure 10A:
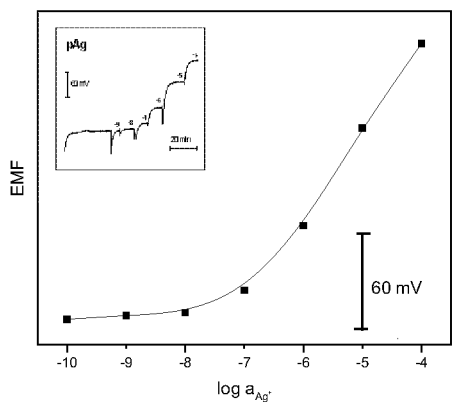
FIG. 10A-10F are graphs illustrating calibration curves of $Ag^+$-selective microelectrodes based on (FIG. 10A-FIG. 10B) 50:50 MMA-DMA.
Figure 10B:
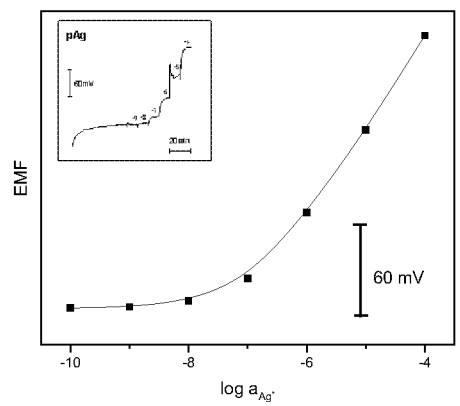
Figure 10C:
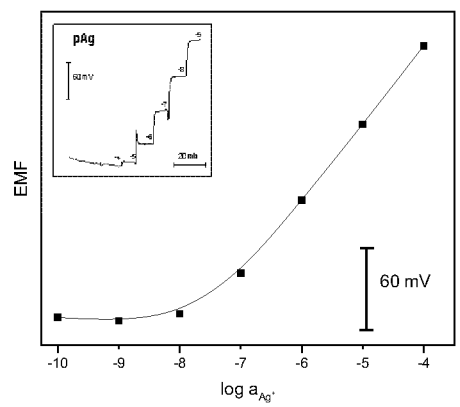
Figure 10D:
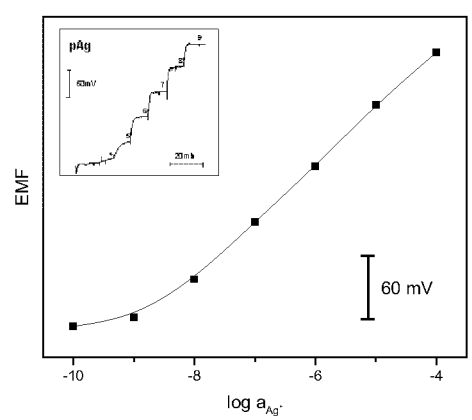
Figure 10E:
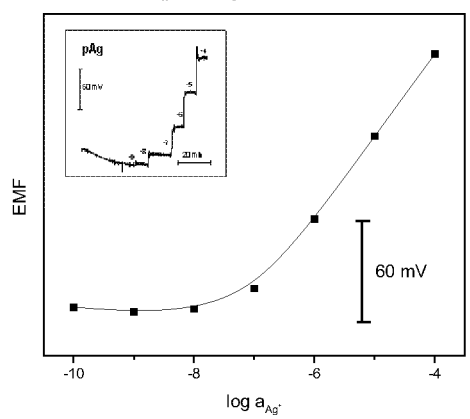
Figure 10F:
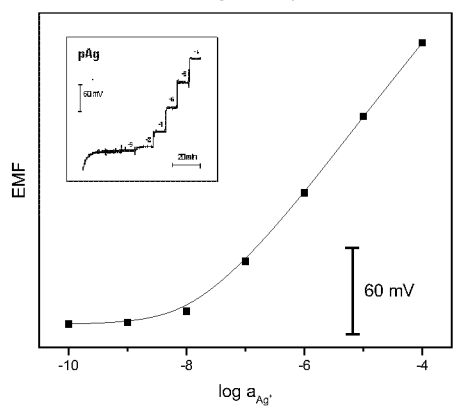

$^a$ $M_w$ = weight average molecular mass,
$^b$ $M_n$ = number average molecular mass In addition, the glass transition temperature ($T_g$) was used to characterize the copolymer (Table 2). The softest copolymer was that which contained the most DMA units (29:71 MMA-DMA copolymer). The expected theoretical $T_g$ for this ratio was 1° C. using the Fox equation. The experimental $T_g$ for this ratio could not be determined. The hardest copolymer was the one which contained the least amount of DMA unit (50:50 MMA-DMA copolymer). This ratio has an expected theoretical $T_g$ of 11° C. and the experimental $T_g$ was found to be 16° C. The 42:58 MMA-DMA copolymer, was found to have a $T_g$ of 10° C., while the theoretical was 4° C. Without being bound by theory, the disparities between the theoretical $T_g$s and the experimental $T_g$s may be attributed to irregularity in macromolecular structure from atactic chain growth. This disparity was in strong correlation for the multiple polymers. Moreover, the NMR spectra's for each ratio showed no monomer impurities using the method suggested here (FIG. 9). Thus, the modification for the purification of MMA-DMA copolymers was suitable for synthesis reproducibility. Likewise, each spectrum consisted of peaks at the same chemical shifts but different intensity with respect to the MMA-DMA ratios. The relevant peaks for MMA and DMA were located at 3.47 and 3.90 ppm, respectively.

Example 17: Coefficient of Diffusion of MMA-DMA Copolymers

Thin film membranes were fabricated using each ratio of MMA-DMA copolymer described before. Plasticizer (20% o-NPOE) was found necessary to be incorporated into the membrane composition to allow diffusion of ions in short periods of time. And, the response behavior for the deprotonation of chromoionophore I can be monitored to indirectly determine the activity of the sodium ions going in and dissociated proton out of the MMA-DMA membrane with respect to time. Thus, allowing calculation of the apparent coefficient of diffusion for sodium ions in this type of thin film membrane. Furthermore, the apparent diffusion coefficient for sodium ions into the MMA-DMA copolymers containing 20% o-NPOE was found to be in the order of $10^{-11}$ to $10^{-12}$ cm$^2$ s$^{-1}$ (Table 3).

TABLE 3

Apparent diffusion coefficients in a thin film membrane

| | Thin film 1 | | | Thin film 2 | | | Thin film 3 | | |
|---|---|---|---|---|---|---|---|---|---|
| MMA:DMA (wt %) | Dapp | Thickness (µm) | $R^2$ | Dapp | Thickness (µm) | $R^2$ | Dapp | Thickness (µm) | $R^2$ |
| 29:71 | 1.263E−11 | 1.2647 | 0.9915 | 1.070E−11 | 1.3565 | 0.9954 | 1.162E−11 | 1.4220 | 0.9764 |
| 42:58 | 1.379E−12 | 0.5585 | 0.9951 | 1.980E−11 | 1.6475 | 0.9979 | 1.923E−11 | 1.7205 | 0.999 |
| 50:50 | 1.253E−12 | 0.5449 | 0.9968 | 2.656E−11 | 2.3110 | 0.9928 | 4.368E−11 | 2.2215 | 0.9964 |

A trend within the MMA-DMA ratio was observed, where the copolymer which contained more MMA (50:50) unit exhibited higher apparent diffusion coefficient, and vice versa for the lower MMA unit (29:71). This may likely be due to the thin film membrane that contains more MMA unit, as the proton is captured more readily by the ester group that is insufficiently protected by a methyl group than compared to DMA unit where the ester group would be sufficiently be protected by 10 carbon alkyl chain. This effect may have allowed the cations to diffuse more readily and may even allow for the cations to "jump" from one ester group of the MMA unit to another, thereby reducing the time it takes for the cations to diffuse in and out of the MMA-DMA copolymer that contains more MMA unit. However, the coefficient of diffusion for sodium ions using MMA-DMA copolymers containing 20% o-NPOE than compared to the conventional plasticized PVC (traditionally contains roughly 66% plasticizer) were much lower, by an order of 2 to 3. This could bring about more accurate ion analysis, may provide a lower limits of detection, (see, e.g., A. Radu, et al., Guidelines for improving the lower detection limit of ion-selective electrodes: A systematic approach, Electroanaly, 19 (2007) 144-54) and may prevent concomitant release of electroactive components for the use MMA-DMA copolymers as an ISE membrane when no additional plasticizer is used.

Example 18: Potentiometric Response of the Ion-Selective Electrodes

Copper (II) ionophore I was used as the ionophore for these membranes as this ionophore has previously shown high selectivity for silver ions (See, S. T. Mensah, et al., Nanomolar Detection Limits of Cd2+, Ag+, and K+ Using Paper-Strip Ion-Selective Electrodes, Anal. Chem. (2014) 7269-73). Before measurements, the ISEs were conditioned in a solution of $AgNO_3$ to allow sufficient formation of the ion-ionophore complex within the membrane. Table 4 outlines the Nernstian slope and lower limits of detection behavior when different MMA-DMA ratios were employed.

TABLE 4

Potentiometric response characteristics of $Ag^+$-selective microelectrodes based on different ratios of MMA-DMA copolymer

| Ratios of MMA-DMA copolymer | Conditioning in $1.0 \times 10^{-3}$M $AgNO_3$ solution | | Conditioning in $1.0 \times 10^{-9}$M $AgNO_3$ and $1.0 \times 10^{-5}$M $NaNO_3$ solution | |
|---|---|---|---|---|
| | Limit of detection (M) | Slope (mV decade$^{-1}$) | Limit of detection (M) | Slope (mV decade$^{-1}$) |
| 29.0:71.0 | $9.3 \times 10^{-8}$ | 55.28 | $2.9 \times 10^{-8}$ | 55.80 |
| 41.5:58.5 | $2.1 \times 10^{-8}$ | 56.88 | $2.6 \times 10^{-9}$ | 55.72 |
| 50.0:50.0 | $1.0 \times 10^{-7}$ | 54.70 | $1.5 \times 10^{-7}$ | 50.20 |

The slope after conditioning in the low ion concentration solution was 50.2 My decade$^{-1}$ with a limit of detection of $1.5 \times 10^{-7}$ M. The slope and limit of detection of this ratio were not optimal as this copolymer contained more MMA unit, the 'deprotected' ester groups might have caused an interference towards the generation of enough charge potential at the phase boundary for lower concentrations of silver ions. Thus, due to this interference, sensitivity for this 50:50 MMA-DMA based ISE was compromised. Henceforth, the amount of DMA unit should not be smaller than 50% of the MMA-DMA copolymer. ISEs constructed with the 42:58 MMA-DMA reliably produced a slope of 55.7 mV decade$^{-1}$ along with a limit of detection of $2.6 \times 10^{-9}$ M.

ISEs made with the 29:71 ratio produced a slope of 55.8 mV decade$^{-1}$ after conditioning in the low ion concentration solution with a limit of detection of $2.9 \times 10^{-8}$ M, While the 29:71 ratio response should have been better than that of the 42:58 ratio, it did not accomplish nanomolar limits of detection, even though it had the lowest coefficient of diffusion of ions and MMA units. The likely cause for such results from the MMA-DMA (29:71) may be due to its high adhesive property which caused the construction of the ISE membrane to be difficult and the microelectrodes may not have been of the same consistency. Therefore, the optimal ratio of MMA-DMA copolymer ratios tested was deemed to be 42:58, as this ratio seemed to have an ideal mechanical and adhesive property for the fabrication of the ISE membrane and better lower limits of detection.

It should be borne in mind that all patents, patent applications, patent publications, technical publications, scientific publications, and other references referenced herein are hereby incorporated by reference in this application in order to more fully describe the state of the art to which the present invention pertains.

It is important to an understanding of the present invention to note that all technical and scientific terms used herein, unless defined herein, are intended to have the same meaning as commonly understood by one of ordinary skill in the art. The techniques employed herein are also those that are known to one of ordinary skill in the art, unless stated otherwise. For purposes of more clearly facilitating an understanding the invention as disclosed and claimed herein, the preceding definitions are provided.

While a number of embodiments of the present invention have been shown and described herein in the present context, such embodiments are provided by way of example only, and not of limitation. Numerous variations, changes and substitutions will occur to those of skill in the art without materially departing from the invention herein. For example, the present invention need not be limited to best mode disclosed herein, since other applications can equally benefit from the teachings of the present invention. Also, in the claims, any means-plus-function and step-plus-function clauses are intended to cover the structures and acts, respectively, described herein as performing the recited function and not only structural equivalents or act equivalents, but also equivalent structures or equivalent acts, respectively. Accordingly, all such modifications are intended to be included within the scope of this invention as defined in the following claims, in accordance with relevant law as to their interpretation.

REFERENCES

[1] Sadeghi, R.; Karimi-Maleh, H.; Khalilzadeh, M. A.; Beitollahi, H.; Ranjbarha, Z.; Zanousi, M. B. P. *Environ. Sci. Pollut. R* 2013, 20, 6584-6593.
[2] Jain, R.; Tiwari, D. C.; Pandey, P. *Electroanalysis* 2013, 25, 1363-1367.
[3] Rubinova, N.; Chumbimuni-Torres, K.; Bakker, E. *Sens. Actuators, B* 2007, 121, 135-141.
[4] Bobacka, J.; Ivaska, A.; Lewenstam, A. *Electroanalysis* 2003, 15, 366-374.
[5] Chumbimuni-Torres, K. Y.; Dai, Z.; Rubinova, N.; Xiang, Y.; Pretsch, E.; Wang, J.; Bakker, E. *J. Am. Chem. Soc* 2006, 128, 13676-13677.

[6] Numnuam, A.; Chumbimuni-Torres, K. Y.; Xiang, Y.; Bash, R.; Thavarungkul, P.; Kanatharana, P.; Pretsch, E.; Wang, J.; Bakker, E. *Anal. Chem.* 2008, 80, 707-712.

[7] Michalska, A.; Hulanicki, A.; Lewenstam, A. *Microchem. J.* 1997, 57, 59-64.

[8] Bobacka, J. *Anal. Chem.* 1999, 71, 4932-4937.

[9] Zielinska, R.; Mulik, E.; Michalska, A.; Achmatowicz, S.; Maj-Zurawska, M. *Anal. Chim. Acta* 2002, 451, 243-249.

[10] Michalska, A. J.; Appaih-Kusi, C.; Heng, L. Y.; Walkiewicz, S.; Hall, E. A. H. *Anal. Chem.* 2004, 76, 2031-2039.

[11] Sutter, J.; Radu, A.; Peper, S.; Bakker, E.; Pretsch, E. *Anal. Chim. Acta* 2004, 523, 53-59.

[12] Chumbimuni-Torres, K. Y.; Rubinova, N.; Radu, A.; Kubota, L. T.; Bakker, E. *Anal. Chem.* 2006, 78, 1318-1322.

[13] Bobacka, J. *Electroanalysis* 2006, 18, 7-18.

[14] Veder, J. P.; De Marco, R.; Clarke, G.; Chester, R.; Nelson, A.; Prince, K.; Pretsch, E.; Bakkert, E. *Anal. Chem.* 2008, 80, 6731-6740.

[15] Fibbioli, M.; Morf, W. E.; Badertscher, M.; de Rooij, N. F.; Pretsch, E. *Electroanalysis* 2000, 12, 1286-1292.

[16] Borchardt, M.; Dumschat, C.; Cammann, K.; Knoll, M. *Sens. Actuators, B* 1995, 25, 721-723.

[17] Dumschat, C.; Borchardt, M.; Diekmann, C.; Cammann, K.; Knoll, M. *Sens. Actuators, B* 1995, 24, 279-281.

[18] Aragay, G.; Monton, H.; Pons, J.; Font-Bardia, M.; Merkoci, A. *J. Mater. Chem.* 2012, 22, 5978-5983.

[19] Szucs, J.; Gyurcsanyi, R. E. *Electroanalysis* 2012, 24, 146-152.

[20] Martinez, A. W.; Phillips, S. T.; Whitesides, G. M.; Carrilho, E. *Anal. Chem.* 2010, 82, 3-10.

[21] Dungchai, W.; Chailapakul, O.; Henry, C. S. *Analyst* 2011, 136, 77-82.

[22] Apilux, A.; Dungchai, W.; Siangproh, W.; Praphairaksit, N.; Henry, C. S.; Chailapakul, O. *Anal. Chem.* 2010, 82, 1727-1732.

[23] Martinez, A. W.; Phillips, S. T.; Butte, M. J.; Whitesides, G. M. *Angew. Chem. Int. Ed* 2007, 46, 1318-1320.

[24] Martinez, A. W.; Phillips, S. T.; Carrilho, E.; Thomas, S. W.; Sindi, H.; Whitesides, G. M. *Anal. Chem.* 2008, 80, 3699-3707.

[25] Hu, L. B.; Choi, J. W.; Yang, Y.; Jeong, S.; La Mantia, F.; Cui, L. F.; Cui, Y. *Proc. Natl. Acad. Sci. USA* 2009, 106, 21490-21494.

[26] Hu, L. B.; Pasta, M.; La Mantia, F.; Cui, L. F.; Jeong, S.; Deshazer, H. D.; Choi, J. W.; Han, S. M.; Cui, Y. *Nano Lett* 2010, 10, 708-714.

[27] Hu, L. B.; Wu, H.; Cui, Y. *Appl. Phys. Lett.* 2010, 96, 183502. [28] Duzgun, A.; Zelada-Guillen, G. A.; Crespo, G. A.; Macho, S.; Riu, J.; Rius, F. X. *Anal. Bioanal. Chem* 2011, 399, 171-181.

[29] Zhu, J. W.; Li, X.; Qin, Y.; Zhang, Y. H. *Sens. Actuators, B* 2010, 148, 166-172.

[30] Zhu, J. W.; Qin, Y.; Zhang, Y. H. *Electrochem. Commun* 2009, 11, 1684-1687.

[31] Crespo, G. A.; Macho, S.; Rius, F. X. *Anal. Chem.* 2008, 80, 1316-1322.

[32] Crespo, G. A.; Macho, S.; Bobacka, J.; Rius, F. X. *Anal. Chem.* 2009, 81, 676-681.

[33] Novell, M.; Parrilla, M.; Crespo, G. A.; Rius, F. X.; Andrade, F. J. *Anal. Chem.* 2012, 84, 4695-4702.

[34] Hertel, T.; Walkup, R. E.; Avouris, P. *Phys. Rev. B* 1998, 58, 13870-13873.

[35] Liu, J.; Rinzler, A. G.; Dai, H. J.; Hafner, J. H.; Bradley, R. K.; Boul, P. J.; Lu, A.; Iverson, T.; Shelimov, K.; Huffman, C. B.; Rodriguez-Macias, F.; Shon, Y. S.; Lee, T. R.; Colbert, D. T.; Smalley, R. E. *Science* 1998, 280, 1253-1256.

[36] Michalska, A.; Dumanska, J.; Maksymiuk, K. *Anal. Chem.* 2003, 75, 4964-4974.

[37] Cattrall, R. W.; Drew, D. M.; Hamilton, I. C. *Anal. Chim. Acta* 1975, 76, 269-277.

[38] Lai, C. Z.; Fierke, M. A.; Stein, A.; Buhlmann, P. *Anal. Chem.* 2007, 79, 4621-4626.

[39] Jaworska, E.; Lewandowski, W.; Mieczkowski, J.; Maksymiuk, K.; Michalska, A. *Analyst* 2013, 138, 2363-2371.

[40] Gu, Y. Q.; Huang, J. G. *J. Mater. Chem.* 2009, 19, 3764-3770.

[41] Heng, L. Y.; Toth, K.; Hall, E. A. H. *Talanta* 2004, 63, 73-87.

[42] Bakker, E. *Anal. Chem.* 1997, 69, 1061-1069.

[43] Bakker, E.; Pretsch, E.; Buhlmann, P. *Anal. Chem.* 2000, 72, 1127-1133.

[44] A. Ceresa, E. Bakker, B. Hattendorf, D. Gunther, E. Pretsch, Potentiometric polymeric membrane electrodes for measurement of environmental samples at trace levels: New requirements for selectivities and measuring protocols, and comparison with ICPMS, Anal Chem, 73(2001) 343-51.

[45] A. Ceresa, A. Radu, S. Peper, E. Bakker, E. Pretsch, Rational design of potentiometric trace level ion sensors. A Ag$^+$-selective electrode with a 100 ppt detection limit, Anal Chem, 74(2002) 4027-36.

[46] E. Bakker, E. Pretsch, Potentiometry at trace levels, Trac-Trend Anal Chem, 20(2001) 11-9.

[47] E. Bakker, E. Pretsch, The new wave of ion-selective electrodes, Anal Chem, 74(2002) 420a-6a.

[48] A. C. Ion, E. Bakker, E. Pretsch, Potentiometric Cd2+-selective electrode with a detection limit in the low ppt range, Anal Chim Acta, 440(2001) 71-9.

[49] S. T. Mensah, Y. Gonzalez, P. Calvo-Marzal, K. Y. Chumbimuni-Torres, Nanomolar Detection Limits of Cd2+, Ag+, and K+ Using Paper-Strip Ion-Selective Electrodes, Anal Chem, 86(2014) 7269-73.

[50] J. Bobacka, Conducting polymer-based solid-state ion-selective electrodes, Electroanal, 18(2006) 7-18.

[51] E. Pretsch, The new wave of ion-selective electrodes, Trac-Trend Anal Chem, 26(2007) 46-51.

[52] J. Sutter, A. Radu, S. Peper, E. Bakker, E. Pretsch, Solid-contact polymeric membrane electrodes with detection limits in the subnanomolar range, Anal Chim Acta, 523(2004) 53-9.

[53] A. Malon, A. Radu, W. Qin, Y. Qin, A. Ceresa, M. Maj-Zurawska, et al., Improving the detection limit of anion-selective electrodes: An iodide-selective membrane with a nanomolar detection limit, Anal Chem, 75(2003) 3865-71.

[54] S. Peper, I. Tsagkatakis, E. Bakker, Cross-linked dodecyl acrylate microspheres: novel matrices for plasticizer-free optical ion sensing, Anal Chim Acta, 442(2001) 25-33.

[55] D. N. Reinhoudt, J. F. J. Engbersen, Z. Brzozka, H. H. Vandenvlekkert, G. W. N. Honig, H. A. J. Holterman, et al., Development of Durable K+-Selective Chemically-Modified Field-Effect Transistors with Functionalized Polysiloxane Membranes, Anal Chem, 66(1994) 3618-23.

[56] Y. Qin, S. Peper, A. Radu, A. Ceresa, E. Bakker, Plasticizer-free polymer containing a covalently immobi-

[57] E. Lindner, V. V. Cosofret, S. Ufer, T. A. Johnson, R. B. Ash, H. T. Nagle, et al., In-Vivo and in-Vitro Testing of Microelectronically Fabricated Planar Sensors Designed for Applications in Cardiology, Fresen J Anal Chem, 346(1993) 584-8.

[58] G. Hogg, O. Lutze, K. Cammann, Novel membrane material for ion-selective field-effect transistors with extended lifetime and improved selectivity, Anal Chim Acta, 335(1996) 103-9.

[59] A. Hammer, D. Gloor-Ertekes, P. Reichmuth, E. Pretsch, W. E. Morf, N. F. D. Rooij, Chemical sensors based on novel polyurethane membranes with covalently bound ion-selective components, Adv Sci Technol, 26(1999) 63-8.

[60] M. E. Poplawski, R. B. Brown, K. L. Rho, S. Y. Yun, H. J. Lee, G. S. Cha, et al., One-component room temperature vulcanizing-type silicone rubber-based sodium-selective membrane electrodes, Anal Chim Acta, 355 (1997) 249-57.

[61] G. J. Moody, B. Saad, J. D. R. Thomas, Glass-Transition Temperatures of Polyvinyl-Chloride) and Polyacrylate Materials and Calcium Ion-Selective Electrode Properties, Analyst, 112(1987) 1143-7.

[62] L. Y. Heng, E. A. H. Hall, Methacrylic-acrylic polymers in ion-selective membranes: achieving the right polymer recipe, Anal Chim Acta, 403(2000) 77-89.

[63] L. Y. Heng, E. A. H. Hall, Producing "self-plasticizing" ion-selective membranes, Anal Chem, 72(2000) 42-51.

[64] E. Malinowska, L. Gawart, P. Parzuchowski, G. Rokicki, Z. Brzozka, Novel approach of immobilization of calix[4]arene type ionophore in 'self-plasticized' polymeric membrane, Anal Chim Acta, 421(2000) 93-101.

[65] L. Y. Heng, E. A. H. Hall, One-step synthesis of $K^+$-selective methacrylic-acrylic copolymers containing grafted ionophore and requiring no plasticizer, Electroanal, 12(2000) 178-86.

[66] L. Y. Heng, E. A. H. Hall, Taking the plasticizer out of methacrylic-acrylic membranes for $K^+$-selective electrodes, Electroanal, 12(2000) 187-93.

[67] L. Y. Heng, E. A. H. Hall, Assessing a photocured self-plasticised acrylic membrane recipe for Na+ and K+ ion selective electrodes, Anal Chim Acta, 443(2001) 25-40.

[68] L. Y. Heng, K. Toth, E. A. H. Hall, Ion-transport and diffusion coefficients of non-plasticised methacrylic-acrylic ion-selective membranes, Talanta, 63(2004) 73-87.

[69] R. De Marco, J. P. Veder, G. Clarke, A. Nelson, K. Prince, E. Pretsch, et al., Evidence of a water layer in solid-contact polymeric ion sensors, Phys Chem Chem Phys, 10(2008) 73-6.

[70] Y. Qin, S. Peper, E. Bakker, Plasticizer-free polymer membrane ion-selective electrodes containing a methacrylic copolymer matrix, Electroanal, 14(2002) 1375-81.

[71] I. Erol, A. I. Ozturk, Free radical copolymerization of novel methacrylates with acrylonitrile and determination of monomer reactivity ratios, J Polym Res, 12(2005) 403-12.

[72] A. Radu, S. Peper, E. Bakker, D. Diamond, Guidelines for improving the lower detection limit of ion-selective electrodes: A systematic approach, Electroanal, 19(2007) 144-54.

[73] E. Bakker, "Hydrophobic Membranes as Liquid Junction-Free Reference Electrodes," Electroanalysis 1999, 11 (10-11), 788-792.

[74] D. Cicmil, et al., "Ionic Liquid-Gased, Liquid Junction-Free Reference Electrode," Electroanal. 2011 23 (8): 1888-90.

What is claimed is:

1. An ion-selective electrode comprising:
   a substrate layer;
   a carbon nanotube layer disposed on the substrate layer;
   a conductive metal layer on a portion of the carbon nanotube layer;
   a conductive polymer disposed on the portion; and
   an ion-selective membrane disposed on the conductive polymer.

2. The ion-selective electrode of claim 1, further comprising a plastic mask on both sides of the carbon nanotube layer with an opening over the ion-selective membrane.

3. The ion-selective electrode of claim 2, wherein the carbon nanotube layer is exposed at a location separated from said opening.

4. The ion-selective electrode of claim 1, wherein the ion-selective electrode comprises one or more of the following: (a) wherein the substrate layer comprises paper, glass, silica, or plastic; (b) wherein the conductive metal layer is comprised of gold, platinum, copper or silver; (c) wherein the conductive polymer is comprised of polythiophenes; polyanilines; polypyrroles; polyethylenedioxythiophenes; polyacetylenes, and/or poly (p-phenylene vinylene) s; or (d) wherein the ion-selective membrane is comprised of polyvinyl chloride, silicone rubber, polyurethane, Teflon, acrylate, and/or perfluoropolymers.

5. The ion-selective electrode of claim 1, wherein the ion-selective membrane is comprised of the copolymer MMA-DMA.

6. The ion-selective membrane comprising the copolymer MMA-DMA of claim 5, wherein the MMA-DMA copolymer is comprised of different ratios of MMA monomer and DMA monomer selected from the group consisting of: 29:71, 42:58, 44:56, and 50:50.

7. The ion-selective membrane comprising the copolymer MMA-DMA of claim 6, wherein the MMA-DMA copolymer is a ratio of 42:58 MMA monomer and DMA monomer.

8. The ion-selective electrode of claim 1, wherein the ion-selective membrane comprises an ionophore for an analyte ion of interest.

9. The ion-selective electrode of claim 8, wherein the ion-selective membrane has been doped with a salt of an analyte ion of interest.

10. The ion-selective electrode of claim 9, wherein the analyte ion of interest is selected from the group consisting of sodium, potassium, silver, lead, cadmium, calcium, magnesium, copper, zinc, mercury, carbonate, phosphate, fluorine, bromine, sulfer, hydrogen sulfite, aluminum, and ammonium ions.

11. A system for detecting a plurality of analyte ions in a sample, said system comprising
   a housing;
   a plurality of ion-selective electrodes according to claim 1 associated with the housing, each electrode comprising an ion-selective membrane to a different analyte ion of interest; and
   a reference electrode associated with the housing; and
   a fluid sample receptacle associated with said housing and in fluid communication with said plurality of ion-selective electrodes and reference electrode.

12. The system of claim 11, wherein said system comprises a microfluidic device comprising a plurality of channels for delivering said fluid sample to the plurality of ion-selective electrodes and reference electrode.

13. The system of claim 11, wherein the plurality of ion-selective electrodes and said reference electrode are effectively separated such that detection of an analyte ion of by one ion-selective electrode does not interfere with detection of a different analyte ion by a different ion-selective electrode.

14. The ion-selective electrode of claim 1, wherein the ion selective electrode is non-conditioned and comprises a 2:1 ratio of ionophore to ion-exchanger.

15. A paper-based sensor comprising (i) an ion selective electrode according to claim 1 and (ii) a reference electrode.

16. The paper-based sensor of claim 15, wherein the reference electrode is a solid-contact reference electrode.

17. The paper-based sensor of claim 16, wherein the solid-contact reference electrode is a poly (methyl methacrylate-co-decyl methacrylate) ionic liquid.

18. The paper-based sensor of claim 17, wherein the poly (methyl methacrylate-co-decyl methacrylate) is at a methyl methacrylate (MMA) to decyl methacrylate (DMA) ratio of 14:56.

19. A multiplex paper-based sensor comprising (i) a plurality of ion-selective electrodes of claim 1 and (ii) a reference electrode.

* * * * *